(12) United States Patent
Ferguson et al.

(10) Patent No.: US 11,176,591 B2
(45) Date of Patent: Nov. 16, 2021

(54) SYSTEMS AND METHODS FOR REMOTE OPERATION OF ROBOT VEHICLES

(71) Applicant: Nuro, Inc., Mountain View, CA (US)

(72) Inventors: David Ferguson, San Francisco, CA (US); Jiajun Zhu, Palo Alto, CA (US); Yi Shen, Mountain View, CA (US); Calvin Giroud, Mountain View, CA (US); Qunyan Pu, Sunnyvale, CA (US)

(73) Assignee: NURO, INC., Mountain View, CA (US)

( * ) Notice: Subject to any disclaimer, the term of this patent is extended or adjusted under 35 U.S.C. 154(b) by 0 days.

(21) Appl. No.: 16/745,676

(22) Filed: Jan. 17, 2020

(65) Prior Publication Data

US 2020/0150674 A1    May 14, 2020

Related U.S. Application Data

(62) Division of application No. 16/048,737, filed on Jul. 30, 2018, now Pat. No. 10,583,803.

(Continued)

(51) Int. Cl.
*G06Q 30/06* (2012.01)
*G08G 1/04* (2006.01)
(Continued)

(52) U.S. Cl.
CPC ............ *G06Q 30/0631* (2013.01); *A23L 2/52* (2013.01); *A23L 5/00* (2016.08); *A23L 7/109* (2016.08);
(Continued)

(58) Field of Classification Search
CPC ........... G06Q 10/0837; G06Q 10/0833; G06Q 30/0631; G06Q 10/0832; G06Q 10/0835;
(Continued)

(56) References Cited

U.S. PATENT DOCUMENTS 8,996,224 B1    3/2015 Herbach et al.
9,008,890 B1    4/2015 Herbach et al.
(Continued)

FOREIGN PATENT DOCUMENTS

| DE | 102013208348 | * 11/2014 |
|----|--------------|-----------|
| WO | 2016183525 A1 | 11/2016 |
| WO | WO-2016/183525 | * 11/2016 |
| WO | 2008005660 A2 | 1/2018 |

OTHER PUBLICATIONS

Notification of Transmittal of the International Search Report and the Written Opinion of the International Search Authority, or the Declaration issued in corresponding application No. PCT/US2018/044110 dated Oct. 26, 2018, 17 pages.

(Continued)

*Primary Examiner* — Muhammad Shafi

(57) ABSTRACT

An autonomous robot vehicle in accordance with aspects of the present disclosure includes a land vehicle conveyance system, a sensor system configured to capture information including surrounding environment information and/or vehicle subsystem information, a communication system configured to communicate with a remote human operator management system, at least one processor, and a memory storing instructions. The instructions, when executed by the processor(s), cause the autonomous robot land vehicle to, autonomously, determine based on the captured information to request a remote human operator, and communicate a request to the remote human operator management system for a remote human operator to assume control of the land vehicle conveyance system, where the request includes at least a portion of the captured information.

29 Claims, 14 Drawing Sheets

Related U.S. Application Data

(60) Provisional application No. 62/538,538, filed on Jul. 28, 2017.

(51) Int. Cl.

| | |
|---|---|
| B60P 3/00 | (2006.01) |
| B60R 21/34 | (2011.01) |
| B65G 67/24 | (2006.01) |
| G01C 21/34 | (2006.01) |
| G05D 1/00 | (2006.01) |
| G05D 1/02 | (2020.01) |
| G05D 1/12 | (2006.01) |
| G06K 7/10 | (2006.01) |
| G06Q 10/06 | (2012.01) |
| G06Q 10/08 | (2012.01) |
| G06Q 50/12 | (2012.01) |
| G06Q 50/28 | (2012.01) |
| G08G 1/00 | (2006.01) |
| H04L 29/08 | (2006.01) |
| G06N 20/00 | (2019.01) |
| B60R 25/25 | (2013.01) |
| A23L 5/00 | (2016.01) |
| A23L 7/109 | (2016.01) |
| G06F 16/955 | (2019.01) |
| A23L 2/52 | (2006.01) |
| A47J 37/06 | (2006.01) |
| A47J 47/00 | (2006.01) |
| B60H 1/00 | (2006.01) |
| B60P 1/36 | (2006.01) |
| B60P 3/025 | (2006.01) |
| B60R 19/18 | (2006.01) |
| G06K 7/14 | (2006.01) |
| G06K 19/06 | (2006.01) |
| G06Q 20/00 | (2012.01) |
| G06Q 20/12 | (2012.01) |
| G06Q 20/18 | (2012.01) |
| G07F 17/00 | (2006.01) |
| G07F 17/12 | (2006.01) |
| G07C 5/02 | (2006.01) |
| G07C 5/08 | (2006.01) |
| G06K 9/00 | (2006.01) |
| G06Q 50/30 | (2012.01) |
| G06K 19/07 | (2006.01) |
| H04W 4/024 | (2018.01) |
| H04W 4/40 | (2018.01) |
| G06Q 30/02 | (2012.01) |
| G01C 21/20 | (2006.01) |
| B60R 19/48 | (2006.01) |
| G06F 3/0484 | (2013.01) |
| B60R 21/36 | (2011.01) |
| H04N 5/76 | (2006.01) |
| H05B 6/68 | (2006.01) |

(52) U.S. Cl.
CPC ............ *A47J 37/0658* (2013.01); *A47J 47/00* (2013.01); *B60H 1/00364* (2013.01); *B60H 1/00735* (2013.01); *B60P 1/36* (2013.01); *B60P 3/007* (2013.01); *B60P 3/0257* (2013.01); *B60R 19/18* (2013.01); *B60R 19/483* (2013.01); *B60R 21/34* (2013.01); *B60R 25/25* (2013.01); *B60R 25/252* (2013.01); *B65G 67/24* (2013.01); *G01C 21/20* (2013.01); *G01C 21/343* (2013.01); *G01C 21/3438* (2013.01); *G01C 21/3453* (2013.01); *G05D 1/0027* (2013.01); *G05D 1/0033* (2013.01); *G05D 1/0038* (2013.01); *G05D 1/0061* (2013.01); *G05D 1/0088* (2013.01); *G05D 1/0094* (2013.01); *G05D 1/0212* (2013.01); *G05D 1/0214* (2013.01); *G05D 1/0223* (2013.01); *G05D 1/0231* (2013.01); *G05D 1/0276* (2013.01); *G05D 1/0291* (2013.01); *G05D 1/12* (2013.01); *G06F 16/955* (2019.01); *G06K 7/10297* (2013.01); *G06K 7/10722* (2013.01); *G06K 7/1413* (2013.01); *G06K 9/00201* (2013.01); *G06K 9/00791* (2013.01); *G06K 19/06028* (2013.01); *G06K 19/0723* (2013.01); *G06N 20/00* (2019.01); *G06Q 10/0631* (2013.01); *G06Q 10/0635* (2013.01); *G06Q 10/06315* (2013.01); *G06Q 10/08* (2013.01); *G06Q 10/083* (2013.01); *G06Q 10/0832* (2013.01); *G06Q 10/0833* (2013.01); *G06Q 10/0834* (2013.01); *G06Q 10/0835* (2013.01); *G06Q 10/0837* (2013.01); *G06Q 10/08355* (2013.01); *G06Q 20/00* (2013.01); *G06Q 20/127* (2013.01); *G06Q 20/18* (2013.01); *G06Q 30/0266* (2013.01); *G06Q 30/0645* (2013.01); *G06Q 50/12* (2013.01); *G06Q 50/28* (2013.01); *G06Q 50/30* (2013.01); *G07C 5/02* (2013.01); *G07C 5/08* (2013.01); *G07F 17/0057* (2013.01); *G07F 17/12* (2013.01); *G08G 1/04* (2013.01); *G08G 1/202* (2013.01); *H04L 67/12* (2013.01); *H04W 4/024* (2018.02); *H04W 4/40* (2018.02); *A23V 2002/00* (2013.01); *B60R 21/36* (2013.01); *B60R 2021/346* (2013.01); *G05D 2201/0207* (2013.01); *G05D 2201/0213* (2013.01); *G06F 3/0484* (2013.01); *G08G 1/22* (2013.01); *H04N 5/76* (2013.01); *H05B 6/688* (2013.01)

(58) Field of Classification Search
CPC ............ G06Q 20/127; G06Q 10/0834; G06Q 10/08355; G06Q 30/0266; G06Q 50/12; G06Q 10/083; G06Q 20/00; G06Q 10/0635; G06Q 10/0631; G06Q 20/18; G06Q 50/30; G06Q 30/0645; G06Q 10/06315; G06Q 50/28; G06F 16/955; G06F 3/0484; G05D 1/0223; G05D 1/12; G05D 1/0214; G05D 1/0038; G05D 1/0033; G05D 1/0212; G05D 1/0291; G05D 1/0276; G05D 1/0088; G05D 1/0027; G05D 1/0231; G05D 1/0094; G05D 1/0061; G05D 2201/0207; G05D 2201/0213; H05B 6/688; A23L 7/109; A23L 2/52; A23L 5/00; G01C 21/3453; G01C 21/3438; G01C 21/20; G01C 21/343; A47J 37/0658; B60R 21/36; B60R 21/34; B60R 19/483; B60R 19/18; B60R 25/252; B60R 25/25; B60R 2021/346; H04L 67/12; G06K 7/10722; G06K 9/00201; G06K 9/00791; G06K 7/1413; G06K 19/0723; G06K 19/06028; G06K 7/10297; B60H 1/00735; B60H 1/00364; B60P 3/007; B60P 3/0257; B60P 1/36; G07F 17/12; G07F 17/0057; H04W 4/40; H04W 4/024; B65G 67/24; G08G 1/04; G08G 1/202; G08G 1/22; G06N 20/00; A23V 2002/00; H04N 5/76
USPC ........................................................ 701/2
See application file for complete search history.

(56) References Cited

U.S. PATENT DOCUMENTS

| | | | |
|---|---|---|---|
| 9,494,439 B1* | 11/2016 | Ross | G05D 1/0027 |
| 9,494,935 B2* | 11/2016 | Okumura | B60W 30/00 |
| 9,507,346 B1 | 11/2016 | Levinson et al. | |
| 9,561,941 B1 | 2/2017 | Watts | |
| 9,672,734 B1 | 6/2017 | Ratnasingam | |
| 9,690,290 B2* | 6/2017 | Prokhorov | G05D 1/0022 |
| 2010/0084426 A1 | 4/2010 | Devers et al. | |
| 2014/0081445 A1 | 3/2014 | Villamar | |
| 2014/0136414 A1 | 5/2014 | Abhyanker | |
| 2015/0006005 A1 | 1/2015 | Yu et al. | |
| 2015/0202770 A1 | 7/2015 | Patron et al. | |
| 2016/0129907 A1 | 5/2016 | Kim et al. | |
| 2016/0139594 A1* | 5/2016 | Okumura | B60W 30/00 701/2 |
| 2016/0358475 A1* | 12/2016 | Prokhorov | G05D 1/0022 |
| 2017/0045885 A1* | 2/2017 | Okumura | B60W 30/00 |
| 2017/0123421 A1 | 5/2017 | Kentley et al. | |
| 2017/0174343 A1 | 6/2017 | Erickson et al. | |
| 2017/0192426 A1 | 7/2017 | Rust | |
| 2017/0197626 A1 | 7/2017 | Jammoussi et al. | |
| 2018/0005169 A1* | 1/2018 | High | G06Q 10/06315 |

OTHER PUBLICATIONS

Notification of Transmittal of the International Search Report and the Written Opinion of the International Search Authority, or the Declaration issued in corresponding application No. PCT/US2018/044361 dated Oct. 10, 2018, 12 pages.

Notification of Transmittal of the International Search Report and the Written Opinion of the International Search Authority, or the Declaration issued in corresponding application No. PCT/US2018/044323 dated Nov. 2, 2018, 19 pages.

Mark Harris, "Our Street are made for people: San Fransisco mulls ban on delivery robots", Guardian Sustainable Business, The Guardian, Jul. 27, 2017; https://www.theguardian.com/sustainable-business/2017/may/31/delivery-robots-drones-san-francisco-public-safety-job-loss-fears-marble [retrieved on Oct. 19, 2018]; 5 pages.

GeekSpeek: "How does Starship robotic delivery work", Youtube, Jan. 9, 2016, p. 1; retrieved from Internet: https://www.youtube/com/watch?v=SIGvM1z7YPc [retrieved on Oct. 19, 2018] whole video.

* cited by examiner

SYSTEMS AND METHODS FOR REMOTE OPERATION OF ROBOT VEHICLES

CROSS-REFERENCE TO RELATED APPLICATIONS

The present application is a divisional of U.S. application Ser. No. 16/048,737, filed Jul. 30, 2018, which in turn claims priority to U.S. Provisional Application No. 62/538,538, filed on Jul. 28, 2017, both of which are hereby incorporated by reference in their entirety.

FIELD OF THE TECHNOLOGY

The present application relates to autonomous vehicles, and in particular, to remote operation of autonomous vehicles by human operators.

BACKGROUND

The field of fully-autonomous and/or semi-autonomous robots is a growing field of innovation. Robots are being used for many purposes including warehouse inventory operations, household vacuuming robots, hospital delivery robots, sanitation robots, and military or defense applications.

In the consumer space, handling and delivery of goods and services by autonomous vehicles could improve society in many ways. For example, rather than spending time traveling to a merchant, a person can instead engage in productive work while waiting for an autonomous vehicle to deliver the goods and/or services. With fewer vehicles on the road, traffic conditions would also improve. For example, instead of several people traveling to merchants in several vehicles, a single autonomous vehicle could deliver goods and/or services to those people and thereby reduce the number of vehicles on the road. Other uses and applications for autonomous vehicles are possible as technology progresses. Accordingly, there is interest in developing technologies for autonomous vehicles.

SUMMARY

This disclosure relates to a fully-autonomous and/or semi-autonomous robot fleet and, in particular, to a fleet of robot vehicles in either unstructured outdoor environment or closed environments. In one aspect, the present disclosure provides systems and method for remote operation of autonomous vehicles by human operators, and for prioritizing certain autonomous vehicles for remote human operation based on various factors. In various embodiments, the autonomous vehicles can be any land vehicle, including land vehicles configured to carry persons, cargo, goods, or other objects or substances.

In accordance with aspects of the present disclosure, an autonomous robot land vehicle includes a land vehicle conveyance system, a sensor system configured to capture information including surrounding environment information and/or vehicle subsystem information, a communication system configured to communicate with a remote human operator management system, one or more processors, and a memory storing instructions. The instructions, when executed by the one or more processors, cause the autonomous robot land vehicle to, autonomously, determine based on the captured information to request a remote human operator, and communicate a request to the remote human operator management system for a remote human operator to assume control of the land vehicle conveyance system, where the request includes at least a portion of the captured information.

In various embodiments, in determining to request a remote human operator, the instructions, when executed by the processor(s), cause the autonomous robot land vehicle to determine, based on the vehicle subsystem information, that at least one subsystem is not functioning properly.

In various embodiments, in determining to request a remote human operator, the instructions, when executed by the at least one processor, cause the autonomous robot land vehicle to determine, based on the captured information, that a next maneuver cannot be autonomously determined.

In various embodiments, in determining to request a remote human operator, the instructions, when executed by the at least one processor, cause the autonomous robot land vehicle to determine, based on the surrounding environment information, that a surrounding environment situation is not recognized.

In various embodiments, in determining to request a remote human operator, the instructions, when executed by the at least one processor, cause the autonomous robot land vehicle to access predetermined situations or predetermined roadways that are predetermined to require a request for a remote human operator, and determine, based on the captured information, that at least one of the predetermined situations or the predetermined roadways has been encountered In various embodiments, in determining to request a remote human operator, the instructions, when executed by the at least one processor, cause the autonomous robot land vehicle to determine, based on the surrounding environment information, that a surrounding environment situation should not be autonomously handled.

In various embodiments, in determining to request a remote human operator, the instructions, when executed by the at least one processor, cause the autonomous robot land vehicle to determine, based on the vehicle subsystem information, that a situation of at least one subsystem is not recognized.

In various embodiments, in determining to request a remote human operator, the instructions, when executed by the at least one processor, cause the autonomous robot land vehicle to access a predetermined operating geography, and determine, based on the surrounding environment information, that the autonomous robot land vehicle is outside the predetermined operating geography.

In various embodiments, in determining to request a remote human operator, the instructions, when executed by the at least one processor, cause the autonomous robot land vehicle to determine, based on the captured information, that multiple attempts to execute an autonomous maneuver have failed.

In various embodiments, the instructions, when executed by the at least one processor, cause the autonomous robot land vehicle to determine a risk rating based on the captured information.

In various embodiments, in determining a risk rating based on the captured information, the instructions, when executed by the at least one processor, cause the autonomous robot land vehicle to determine the risk rating based on estimated safety of autonomous risk mitigation procedures that can be effectuated while waiting for a remote human operator to assume control.

In various embodiments, in determining the risk rating based on estimated safety of autonomous risk mitigation procedures, the instructions, when executed by the at least one processor, cause the autonomous robot land vehicle to access the risk mitigation procedures, estimate based on the captured information probability of success in executing the risk mitigation procedures, and determine the risk rating based on the estimated probability of success.

In various embodiments, in estimating the probability of success in executing the risk mitigation procedures, the instructions, when executed by the at least one processor, cause the autonomous robot land vehicle to estimate the probability of success based on at least one of: road speed limits, current vehicle speed, current speed of surrounding vehicles, number of surrounding vehicles, number of surrounding pedestrians, number of surrounding objects, road width, weather conditions, available time to react, or proximity to surrounding vehicles. Other factors are contemplated to be within the scope of the present disclosure.

In various embodiments, the instructions, when executed by the at least one processor, cause the autonomous robot land vehicle to control the land vehicle conveyance system to mitigate risk while waiting for a remote human operator to assume control.

In various embodiments, in controlling the land vehicle conveyance system to mitigate risk, the instructions, when executed by the at least one processor, cause the autonomous robot land vehicle to perform at least one of: park at a curb, parking in a parking lot, travel on roadways in search of parking, or depart from a planned route to a roadway having lower risk.

In various embodiments, in controlling the land vehicle conveyance system to mitigate risk, the instructions, when executed by the at least one processor, cause the autonomous robot land vehicle to travel at a slower speed than a travel speed without the risk.

In various embodiments, the autonomous robot land vehicle does not contain any space for a human passenger or human operator to be within the autonomous robot land vehicle.

In aspects of the present disclosure, a system for assigning remote human operators to autonomous land vehicles includes a database including experience information on a plurality of remote human operators, a communication system configured to communicate with remote autonomous land vehicles, one or more processors, and a memory storing instructions. The instructions, when executed by the processor(s), cause the system to receive via the communication system requests from the remote autonomous land vehicles for remote human operators to assume control, where each of the requests includes risk information generated by the corresponding remote autonomous land vehicle, determine that the number of the requests is greater than the number of available remote human operators, access risk ratings associated with the requests where the risk ratings include at least one of ratings determined by the system based on the risk information generated by the remote autonomous land vehicles or ratings that are determined by the remote autonomous land vehicles and included in the risk information generated by the remote autonomous land vehicles, and assign at least some of the available remote human operators to at least some of the remote autonomous land vehicles based on at least one of the risk ratings or the experience information on the remote human operators.

In various embodiments, in assigning at least some of the available remote human operators to at least some of the remote autonomous land vehicles, the instructions, when executed by the processor(s), cause the system to prioritize assignment of the available remote human operators to remote autonomous land vehicles having highest risk ratings.

In various embodiments, the experience information includes an amount of experience, and in prioritizing assignment of the available remote human operators to remote autonomous land vehicles having highest risk ratings, the instructions, when executed by the at least one processor, cause the system to prefer available remote human operators who have higher amounts of experience.

In various embodiments, the experience information includes experience driving in particular regions, and in assigning at least some of the available remote human operators to at least some of the remote autonomous land vehicles, the instructions, when executed by the processor(s), cause the system to determine, based on the experience information, a group of the available remote human operators who have experience driving in a particular region in which one of the remote autonomous land vehicles is located, and assign one of the remote human operators from the group to the one remote autonomous land vehicle.

In various embodiments, the experience information includes experience driving in particular situations, and each of the requests includes an indication of a risk situation.

In various embodiments, the risk situation includes a vehicle subsystem not functioning properly, and in assigning at least some of the available remote human operators to at least some of the remote autonomous land vehicles, the instructions, when executed by the processor(s), cause the system to determine, based on the experience information, a group of the available remote human operators who have experience remotely operating a vehicle with the vehicle subsystem not functioning properly, and assign one of the remote human operators from the group to the one of the remote autonomous land vehicles. In various embodiments, the vehicle subsystem that is not functioning properly is a navigation subsystem.

In various embodiments, the risk situation includes a surrounding environment situation, and in assigning at least some of the available remote human operators to at least some of the remote autonomous land vehicles, the instructions, when executed by the at least one processor, cause the system to determine, based on the experience information, a group of the available remote human operators who have experience remotely operating a vehicle in the surrounding environment situation, and assign one of the remote human operators from the group to the one of the remote autonomous land vehicles. In various embodiments, the surrounding environment situation includes one or more of an unrecognized object, an emergency services vehicle signaling an emergency, a human directing traffic, and/or an excessive number of pedestrians or vehicles.

Further details and aspects of exemplary embodiments of the present disclosure are described in more detail below with reference to the appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

A better understanding of the features and advantages of the disclosed technology will be obtained by reference to the following detailed description that sets forth illustrative embodiments, in which the principles of the technology are utilized, and the accompanying drawings of which.

DETAILED DESCRIPTION

Figure 1:
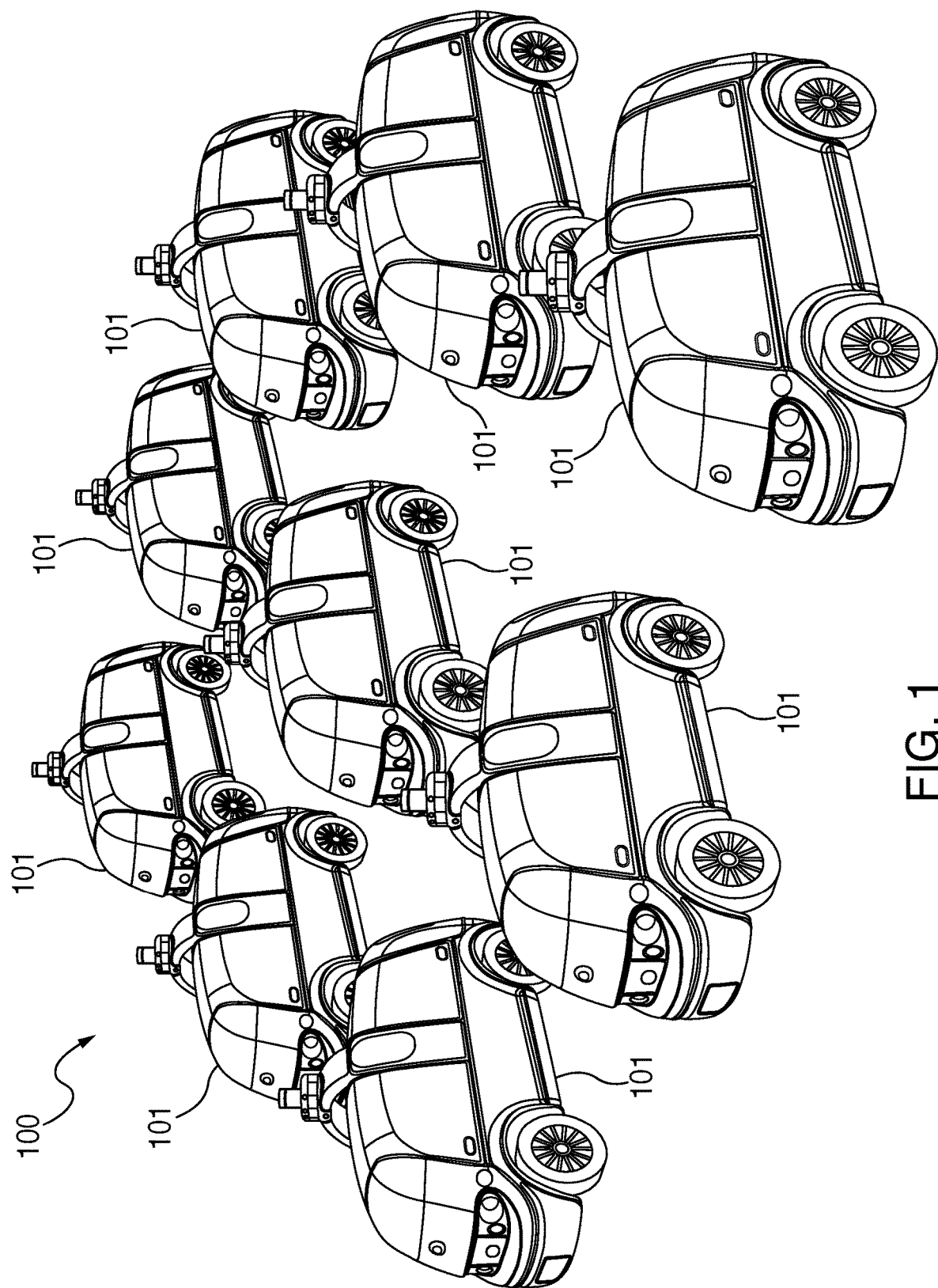
FIG. 1 is an exemplary view an autonomous robot fleet, wherein each vehicle within a fleet or sub-fleet can be branded for an entity.

This disclosure relates to a fully-autonomous and/or semi-autonomous robot fleet and, in particular, to robot vehicles for transporting or retrieving persons or deliveries in either open unstructured outdoor environments or closed environments. In one aspect, the present disclosure provides systems and methods for remote operation of autonomous vehicles by human operators, and for prioritizing certain autonomous vehicles for remote human operation based on various factors. Remote operation of a fully-autonomous or a semi-autonomous vehicle may be appropriate in various situations. For example, if the autonomous vehicle is requested to travel to a destination that has not been fully mapped (e.g., large corporate or university campuses, or public parks, etc.), the autonomous vehicle may not be able to determine how to reach the destination. In other scenarios, an autonomous vehicle may not recognize a situation or may determine that it should not autonomously handle a situation. Accordingly, the capability for a human operator to remotely operate an autonomous vehicle is a beneficial feature. However, as autonomous fleets grow, the number of vehicles will vastly outnumber the number of remote human operators. In accordance with aspects of the present disclosure, systems and methods are disclosed for assigning remote human operators to autonomous vehicles based on various factors.

Provided herein is a robot fleet having robot vehicles operating fully-autonomously or semi-autonomously and a fleet management module for coordination of the robot fleet, where each robot within the fleet is configured for transporting, delivering or retrieving goods or services and is capable of operating in an unstructured open or closed environment. Each robot can include a power system, a conveyance system, a navigation module, at least one securable compartment or multiple securable compartments to hold goods, a controller configurable to associate each of the securable compartments to an assignable customer a customer group within a marketplace, or provider and provide entry when authorized, a communication module and a processor configured to manage the conveyance system, the navigation module, the sensor system, the communication module and the controller.

As used herein, the term "autonomous" includes fully-autonomous, semi-autonomous, and any configuration in which a vehicle can operate in a controlled manner for a period of time without human intervention.

As used herein, the term "fleet," "sub-fleet," and like terms are used to indicate a number of land vehicles operating together or under the same ownership. In some embodiments the fleet or sub-fleet is engaged in the same activity. In some embodiments, the fleet or sub-fleet are engaged in similar activities. In some embodiments, the fleet or sub-fleet are engaged in different activities.

As used herein, the term "robot," "robot vehicle," "robot fleet," "vehicle," "all-terrain vehicle," and like terms are used to indicate a mobile machine that transports persons, cargo, items, and/or goods. Typical vehicles include cars, wagons, vans, unmanned motor vehicles (e.g., tricycles, trucks, trailers, buses, etc.), and unmanned railed vehicles (e.g., trains, trams, etc.), among other types of land vehicles.

As used herein, the term "user," "operator," "fleet operator," and like terms are used to indicate the entity that owns or is responsible for managing and operating the robot fleet.

As used herein, the term "customer" and like terms are used to indicate the entity that requests the services provided the robot fleet.

As used herein, the term "provider," "business," "vendor," "third party vendor," and like terms are used to indicate an entity that works in concert with the fleet owner or operator to utilize the services of the robot fleet to deliver the provider's product from and or return the provider's product to the provider's place of business or staging location.

As used herein, the term "server," "computer server," "central server," "main server," and like terms are used to indicate a computer or device on a network that manages the fleet resources, namely the robot vehicles.

As used herein, the term "controller" and like terms are used to indicate a device that controls the transfer of data from a computer to a peripheral device and vice versa. For example, disk drives, display screens, keyboards, and printers all require controllers. In personal computers, the controllers are often single chips. As used herein the controller is commonly used for managing access to components of the robot such as the securable compartments.

As used herein a "mesh network" is a network topology in which each node relays data for the network. All mesh nodes cooperate in the distribution of data in the network. It can be applied to both wired and wireless networks. Wireless mesh networks can be considered a type of "Wireless ad hoc" network. Thus, wireless mesh networks are closely related to Mobile ad hoc networks (MANETs). Although MANETs are not restricted to a specific mesh network topology, Wireless ad hoc networks or MANETs can take any form of network topology. Mesh networks can relay messages using either a flooding technique or a routing technique. With routing, the message is propagated along a path by hopping from node to node until it reaches its destination. To ensure that all its paths are available, the network must allow for continuous connections and must reconfigure itself around broken paths, using self-healing algorithms such as Shortest Path Bridging. Self-healing allows a routing-based network to operate when a node breaks down or when a connection becomes unreliable. As a result, the network is typically quite reliable, as there is often more than one path between a source and a destination in the network. This concept can also apply to wired networks and to software interaction. A mesh network whose nodes are all connected to each other is a fully connected network.

As used herein, the term "module" and like terms are used to indicate a self-contained hardware component of the central server, which in turn includes software modules. In software, a module is a part of a program. Programs are composed of one or more independently developed modules that are not combined until the program is linked. A single module can contain one or several routines, or sections of programs that perform a particular task. As used herein the fleet management module includes software modules for managing various aspects and functions of the robot fleet.

As used herein, the term "processor," "digital processing device" and like terms are used to indicate a microprocessor or central processing unit (CPU). The CPU is the electronic circuitry within a computer that carries out the instructions of a computer program by performing the basic arithmetic, logical, control and input/output (I/O) operations specified by the instructions.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatus used to store data or programs on a temporary or permanent basis. In some embodiments, the device is volatile memory and requires power to maintain stored information. In some embodiments, the device is non-volatile memory and retains stored information when the digital processing device is not powered. In some embodiments, the non-volatile memory includes flash memory. In some embodiments, the non-volatile memory includes dynamic random-access memory (DRAM). In some embodiments, the non-volatile memory includes ferroelectric random access memory (FRAM). In some embodiments, the non-volatile memory includes phase-change random access memory (PRAM). In some embodiments, the device is a storage device including, by way of non-limiting examples, CD-ROMs, DVDs, flash memory devices, magnetic disk drives, magnetic tapes drives, optical disk drives, and cloud computing based storage. In some embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In some embodiments, the display is a thin film transistor liquid crystal display (TFT-LCD). In some embodiments, the display is an organic light emitting diode (OLED) display. In various some embodiments, on OLED display is a passive-matrix OLED (PMOLED) or active-matrix OLED (AMOLED) display. In some embodiments, the display is a plasma display. In some embodiments, the display is a video projector. In some embodiments, the display is interactive (e.g., having a touch screen or a sensor such as a camera, a 3D sensor, a LiDAR, a radar, etc.) that can detect user interactions/gestures/responses and the like. In still some embodiments, the display is a combination of devices such as those disclosed herein.

The Fleet of Robot Vehicles

Provided herein is a robot fleet 100, as illustrated in FIG. 1, having robot vehicles 101, with each one operating fully-autonomously or semi-autonomously.

As illustrated in FIGS. 3-6, one exemplary configuration of a robot land vehicle 101 is a vehicle configured for land travel, such as a small fully-autonomous (or semi-autonomous) automobile. The exemplary fully-autonomous (or semi-autonomous) automobile is narrow (i.e., 2-5 feet wide), low mass and low center of gravity for stability, having multiple secure compartments assignable to one or more customers, retailers and/or vendors, and designed for moderate working speed ranges (i.e., 1.0-45.0 mph) to accommodate inner-city and residential driving speeds. Additionally, in some embodiments, the land vehicle robot units in the fleet are configured with a maximum speed range from 1.0 mph to about 90.0 mph for high speed, intrastate or interstate driving. Each robot in the fleet is equipped with onboard sensor system 170 (e.g., cameras (running at a high frame rate, akin to video), LiDAR, radar, ultrasonic sensors, microphones, etc.) and internal computer processing to constantly determine where it can safely navigate, what other objects are around each robot and what it may do.

In some embodiments, the robot fleet is fully-autonomous.

In some embodiments, the robot fleet is semi-autonomous. In some embodiments, it may be necessary to have human interaction between the robot land vehicle 101, the fleet operator 200, the provider 204 and/or the customer 202 to address previously unforeseen issues (e.g., a malfunction with the navigation module; provider inventory issues; unanticipated traffic or road conditions; or direct customer interaction after the robot arrives at the customer location).

In some embodiments, the robot fleet 100 is controlled directly by the fleet operator 200. In some embodiments, it may be necessary to have direct human interaction between the robot land vehicle 101 and/or the fleet operator 200 to address maintenance issues such as mechanical failure, electrical failure or a traffic accident. Aspects of the present disclosure relating to remote operation of the robot vehicles by a human operator will be described in more detail in connection with FIGS. 13-17.

In some embodiments, the robot fleet is configured for land travel. In some embodiments, each robot land vehicle in the fleet is configured with a working speed range from 13.0 mph to 45.0 mph. In some embodiments, the land vehicle robot units in the fleet are configured with a maximum speed range from 13.0 mph to about 90.0 mph.

In some embodiments of the robot fleet, the autonomous robots within the fleet are operated on behalf of third party vendor/service provider.

For example, a fleet management service is established to provide a roving delivery service for a third party beverage/food provider (e.g., a coffee service/experience for a third party vendor (i.e., Starbucks)). It is conceived that the fleet management service would provide a sub-fleet of "white label" vehicles carrying the logo and products of that third party beverage/food provider to operate either fully-autonomously or semi-autonomously to provide this service.

In some embodiments of the robot fleet, the autonomous robots within the fleet are further configured to be part of a sub-fleet of autonomous robots, and each sub-fleet is configured to operate independently or in tandem with multiple sub-fleets having two or more sub-fleets (100-*a*, 100-*b*).

For example, a package delivery service is configured to offer multiple levels of service such as "immediate dedicated rush service," "guaranteed morning/afternoon delivery service," or "general delivery service." A service provider could then have a dedicated sub-fleet of delivery vehicles for each type of service within their overall fleet of vehicles. In yet another example, a third party has priority over a certain number of vehicles in the fleet. In so doing, they can guarantee a certain level of responsiveness. When they aren't using the vehicles, the vehicles are used for general services within the fleet (e.g., other third parties).

In some embodiments, the robot fleet is controlled directly by the user.

In some embodiments, there will likely be times when a vehicle breaks down, has an internal system or module failure or is in need of maintenance. For example, in the event that the navigation module should fail, each robot within the fleet is configurable to allow for direct control of the robot's processor to override the conveyance and sensor systems (i.e., cameras, etc.) by a fleet operator to allow for the safe return of the vehicle to a base station for repair.

The Operating Environments

In some embodiments, the unstructured open environment is a non-confined geographic region accessible by navigable pathways, including, for example, public roads, private roads, bike paths, open fields, open public lands, open private lands, pedestrian walkways, lakes, rivers or streams.

In some embodiments, the closed environment is a confined, enclosed or semi-enclosed structure accessible by navigable pathways, including, for example, open areas or rooms within commercial architecture, with or without structures or obstacles therein, airspace within open areas or rooms within commercial architecture, with or without structures or obstacles therein, public or dedicated aisles, hallways, tunnels, ramps, elevators, conveyors, or pedestrian walkways.

In some embodiments, the navigation module controls routing of the conveyance system of the robots in the fleet in the unstructured open or closed environments.

The Fleet Management Module

In some embodiments of the robot fleet 100, the fleet includes a fleet management module 120 (associated with a central server) for coordination of the robot fleet 100 and assignment of tasks for each robot land vehicle 101 in the fleet. The fleet management module coordinates the activity and positioning of each robot in the fleet. In addition to communicating with the robot fleet, fleet owner/operator and/or user, the fleet management module also communicates with providers/vendors/businesses and customers to optimize behavior of the entire system.

The fleet management module works in coordination with a central server 110, typically located in a central operating facility owned or managed by the fleet operator 200.

Figure 11:
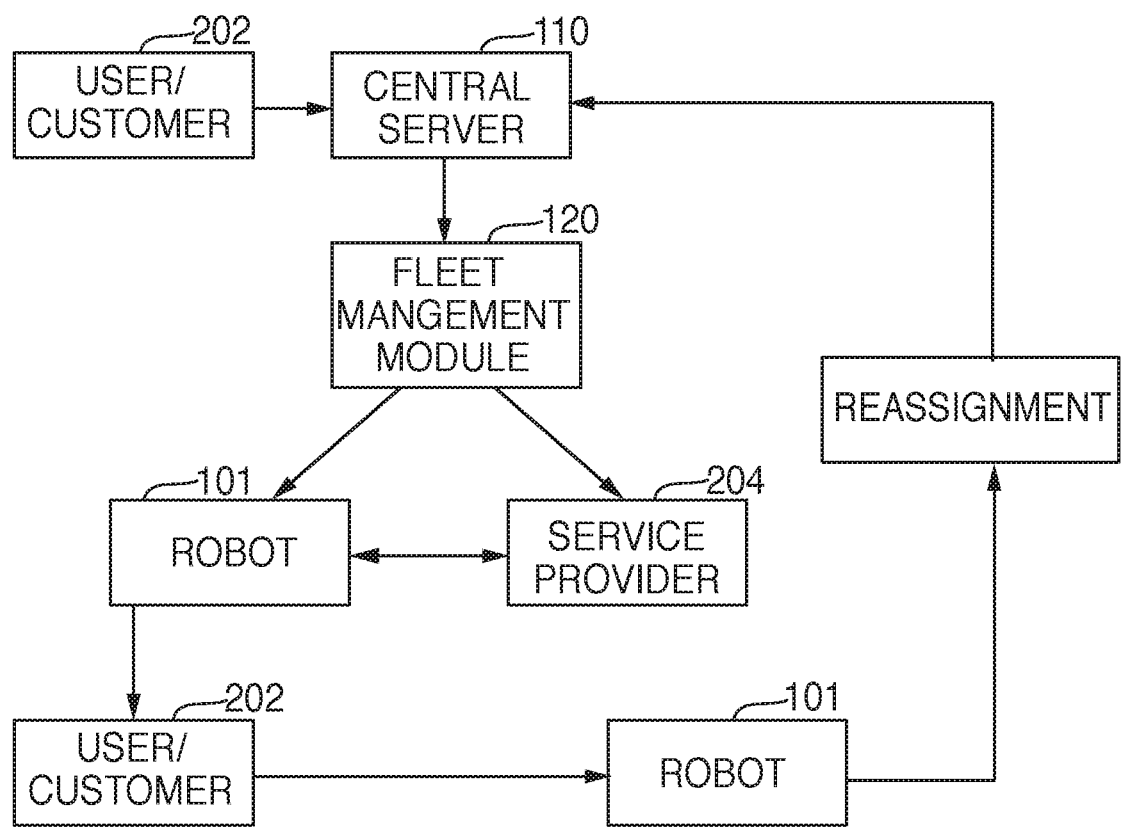
FIG. 11 is an exemplary flowchart representation of the logic for a fleet management control module associated with a central server for the robot fleet.

As illustrated in FIG. 11, in one embodiment, a request is sent to the central server 110 (typically located at the fleet owner's or fleet manager's location), which then communicates with the fleet management module 120. The fleet management module then relays the request to the appropriate provider 204 of the service (e.g., restaurant, delivery service, vendor or retailer) and an appropriate robot land vehicle or robot land vehicles 101 in the fleet. The best appropriate robot(s) in the fleet within the geographic region and typically closest to the service provider, is then assigned the task, and the provider 204 then interacts with that robot land vehicle 101 at their business (e.g., loading it with goods, if needed). The robot then travels to the customer 202 and the customer interacts with the robot to retrieve their goods or service (e.g., the goods ordered). An interaction can include requesting the robot to open its compartment 102, 104 through the customer's app or through a user interface on the robot itself (using, e.g., RFID reader and customer phone, a touchpad, a keypad, voice commands, vision-based recognition of the person, etc.). Upon completion of the delivery (or retrieval, if appropriate), the robot reports completion of the assignment and reports back to the fleet management module for re-assignment.

Figure 12:
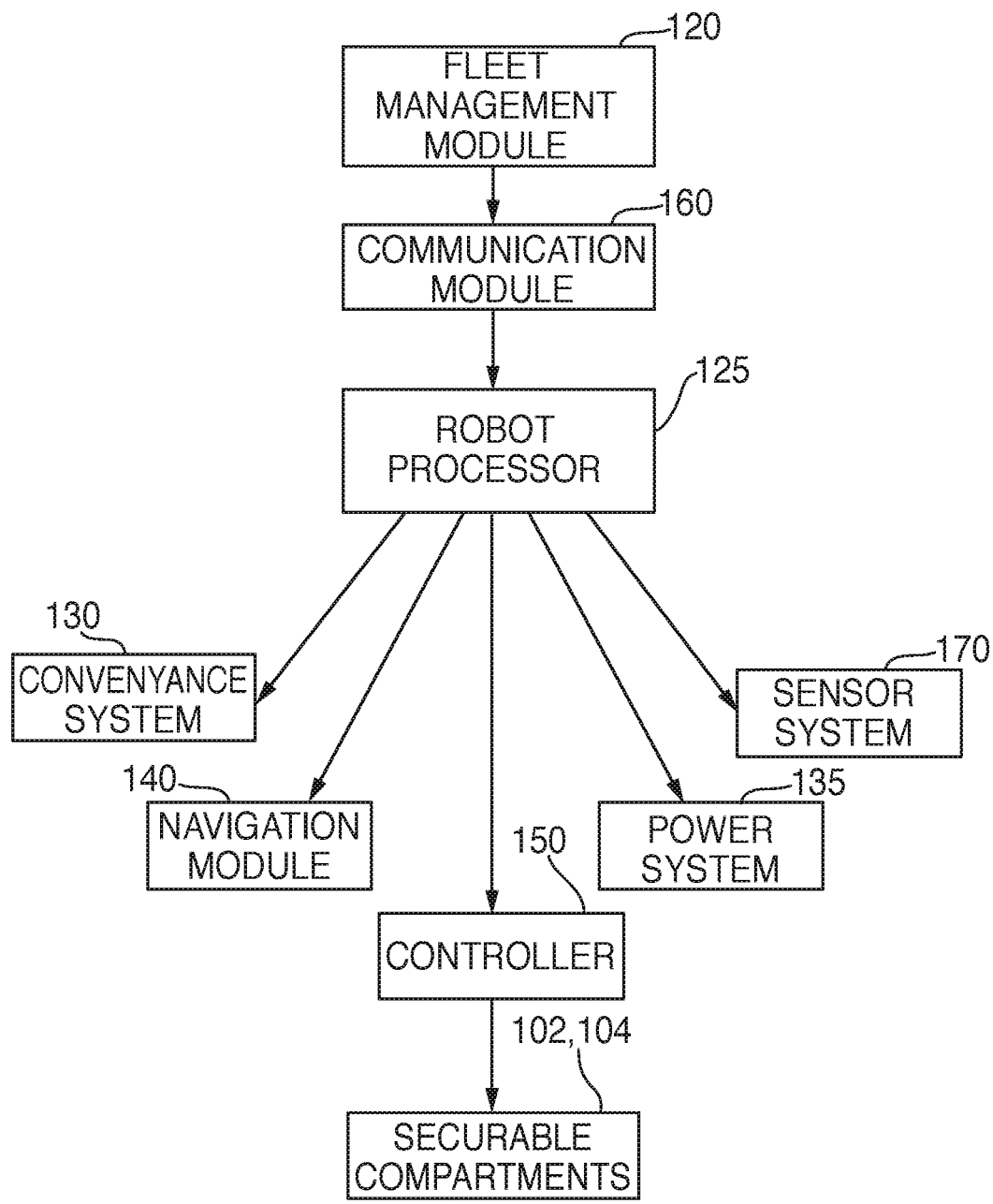
FIG. 12 is an exemplary flowchart representation of the logic flow from the Fleet Management Control Module through the robot processor to the various systems and modules of the robot.

As further illustrated in FIG. 12, and previously noted, in some embodiments, the fleet management module 120 handles coordination of the robot fleet 100 and assignment of tasks for each robot land vehicle 101 in the fleet. The fleet management module coordinates the activity and positioning of each robot in the fleet. The fleet management module also communicates with vendors/businesses 204 and customers 202 to optimize behavior of entire system. It does this by utilizing the robot land vehicle processor 125 to process the various inputs and outputs from each of the robot's systems and modules, including: the conveyance system 130, the power system 135, the navigation module 140, the sensor systems 170, 175, the communication module 160, and the controller 150, to effectively manage and coordinate the various functions of each robot in the fleet.

In some embodiments, the robot may be requested for a pick-up of an item (e.g., a document) with the intent of delivery to another party. In this scenario, the fleet management module would assign the robot to arrive at a given location, assign a securable compartment for receipt of the item, confirm receipt from the first party to the fleet management module, then proceed to the second location where an informed receiving party would recover the item from the robot using an appropriate PIN or other recognition code to gain access to the secure compartment. The robot would then reports completion of the assignment and report back to the fleet management module for re-assignment.

Conveyance Systems

Each robot vehicle 101 in the fleet includes a conveyance system 130 (e.g., a drive system with a propulsion engine, wheels, treads, wings, rotors, blowers, rockets, propellers, brakes, etc.).

As noted previously, the robot fleet is configurable for land travel. Typical vehicles include cars, wagons, vans, unmanned motor vehicles (e.g., tricycles, trucks, trailers, buses, etc.), and unmanned railed vehicles (e.g., trains, trams, etc.), among other types of land vehicles.

In one exemplary embodiment, a robot land vehicle 101 is configured with a traditional 4-wheeled automotive configuration comprising conventional steering and braking systems. The drive train is configurable for standard 2-wheel drive or 4-wheel all-terrain traction drive. The propulsion system (engine) is configurable as a gas engine, a turbine engine, an electric motor and/or a hybrid gas/electric engine. Alternatively, the robot could be configured with an auxiliary solar power system 135 to provide back-up emergency power or power for minor low-power sub-systems.

Alternative configurations of components to a total drive system with a propulsion engine could include wheels, treads, rotors, brakes, etc.

The Power System

In some embodiments, each robot of the robot fleet is configured with one or more power sources, which include the power system 135 (e.g., battery, solar, gasoline, propane, etc.).

Navigation Module

Each robot in the fleet further includes a navigation module 140 for navigation in the unstructured open or closed environments (e.g., digital maps, HD maps, GPS, etc.). In some embodiments, the fleet 100 relies on maps generated by the user, operator, or fleet operator, specifically created to cover the intended environment where the robot is configured to operate. These maps would then be used for general guidance of each robot in the fleet, which would augment this understanding of the environment by using a variety of on-board sensors such as cameras, LiDAR, altimeters or radar to confirm its relative geographic position and elevation.

In some embodiments, for navigation, the fleet of robots uses internal maps to provide information about where they are going and the structure of the road environment (e.g., lanes, etc.) and combine this information with onboard sensors (e.g., cameras, LiDAR, radar, ultrasound, microphones, etc.) and internal computer processing to constantly determine where they can safely navigate, what other objects are around each robot and what they may do. In still other embodiments, the fleet incorporates on-line maps to augment internal maps. This information is then combined to determine a safe, robust trajectory for the robot to follow and this is then executed by the low level actuators on the robot.

In some embodiments, the fleet relies on a global positioning system (GPS) that allows users to determine their exact location, velocity, and time 24 hours a day, in all weather conditions, anywhere in the world.

In some embodiments, the fleet of robots will use a combination of internal maps, sensors and GPS systems to confirm its relative geographic position and elevation.

In some embodiments, the autonomous fleet is strategically positioned throughout a geographic region in anticipation of a known demand.

Over time, a fleet operator 200 and/or a vendor/provider 204 can anticipate demand for robot services by storing data concerning how many orders (and what type of orders) are made at particular times of day from different areas of the region. This can be done for both source (e.g., restaurants, grocery stores, general businesses, etc.) and destination (e.g., customer, other businesses, etc.). Then, for a specific current day and time, this stored data is used to determine what the optimal location of the fleet is given the expected demand. More concretely, the fleet can be positioned to be as close as possible to the expected source locations, anticipating these source locations will be the most likely new orders to come into the system. Even more concretely, it is possible to estimate the number of orders from each possible source in the next hour and weight each source location by this number. Then one can position the fleet so that the fleet optimally covers the weighted locations based on these numbers.

In some embodiments of the robot fleet, the positioning of robots can be customized based on: anticipated use, a pattern of historical behaviors, or specific goods being carried.

Sensor Systems

As noted previously, each robot is equipped with a sensor system 170, which includes at least a minimum number of onboard sensors (e.g., cameras (for example, those running at a high frame rate akin to video), LiDAR, radar, ultrasonic sensors, microphones, etc.) and internal computer processor 125 to constantly determine where it can safely navigate, what other objects are around each robot, and what it may do within its immediate surroundings.

In some embodiments, the robots of the robot fleet further include conveyance system sensors 175 configured to: monitor drive mechanism performance (e.g., the propulsion engine); monitor levels of power system 135 (e.g., battery, solar, gasoline, propane, etc.); or monitor drive train performance (e.g., transmission, tires, brakes, rotors, etc.).

Communications Module

Each robot in the fleet further includes a communication module 160 configurable to receive, store and send data to the fleet management module, to a user, to and from the fleet management module 120, and to and from the robots in the fleet 100. In some embodiments, the data is related to at least user interactions and the robot fleet interactions, including, for example, scheduled requests or orders, on-demand requests or orders, or a need for self-positioning of the robot fleet based on anticipated demand within the unstructured open or closed environments.

In some embodiments, each robot in the fleet includes at least one communication module configurable to receive, store and transmit data, and to store that data to a memory device, for future data transfer or manual download.

In some embodiments, each business 204 and customer 202 has their own app/interface to communicate with the fleet operator 200 (e.g., "Nuro customer app" for customers on their phone, "Nuro vendor app" for businesses on a tablet or phone or their internal computer system, etc.).

In some embodiments, the communication to the user and the robots in the fleet, between the robots of the fleet, and between the user and the robots in the fleet, occurs via wireless transmission.

In some embodiments, the user's wireless transmission interactions and the robot fleet wireless transmission interactions occur via mobile application transmitted by an electronic device and forwarded to the communication module via: a central server, a fleet management module, and/or a mesh network.

In some embodiments, one preferred method of communication is to use cellular communication between the fleet manager and fleet of robots, (e.g., 3G, 4G, 5G, or the like). Alternatively, the communication between the fleet control module and the robots could occur via satellite communication systems.

In some embodiments, a customer uses an app (either on a cellphone, laptop, tablet, computer or any interactive device) to request a service (e.g., an on-demand food order or for a mobile marketplace robot to come to them).

In some embodiments, the electronic device includes: a phone, a personal mobile device, a personal digital assistant (PDA), a mainframe computer, a desktop computer, a laptop computer, a tablet computer, and/or wearable computing device such as a communication headset, smart glasses, a contact lens or lenses, a digital watch, a bracelet, a ring, jewelry, or a combination thereof.

In accordance with aspects of the present disclosure, the communication module 160 of each robot vehicle can be configured to communicate with a remote human operator. For example, the communication module 160 can communicate environmental videos captured by cameras running at a high frame rate to a remote operator, to enable the remote human operator to visualize the vehicle's surroundings. Further, the communication module 160 can receive instructions from the remote human operator for controlling the conveyance system to move the robot vehicle. Further aspects of remotely operating an autonomous vehicle by a human operator will be described in more detail in connection with FIGS. 13-18.

Goods and Services

In some embodiments, the user includes a fleet manager, a sub-contracting vendor, a service provider, a customer, a business entity, an individual, or a third party.

In some embodiments, the services include: subscription services, prescription services, marketing services, advertising services, notification services, or requested, ordered or scheduled delivery services. In particular embodiments, the scheduled delivery services include, by way of example, special repeat deliveries such as groceries, prescriptions, drinks, mail, documents, etc.

In some embodiments, the services further include: the user receiving and returning the same or similar goods within the same interaction (e.g., signed documents), the user receiving one set of goods and returning a different set of goods within the same interaction, (e.g., product replacement/returns, groceries, merchandise, books, recording, videos, movies, payment transactions, etc.), a third party user providing instruction and or authorization to a goods or service provider to prepare, transport, deliver and/or retrieve goods to a principle user in a different location.

In some embodiments, the services further include: advertising services, land survey services, patrol services, monitoring services, traffic survey services, signage and signal survey services, architectural building or road infrastructure survey services.

In some embodiments, at least one robot is further configured to process or manufacture goods.

In some embodiments, the processed or manufactured goods include: beverages, with or without condiments (such as coffee, tea, carbonated drinks, etc.); various fast foods; or microwavable foods.

In some embodiments, the robots within the fleet are equipped for financial transactions. These can be accomplished using known transaction methods such as debit/credit card readers or the like.

Securable Compartments

Figure 2:
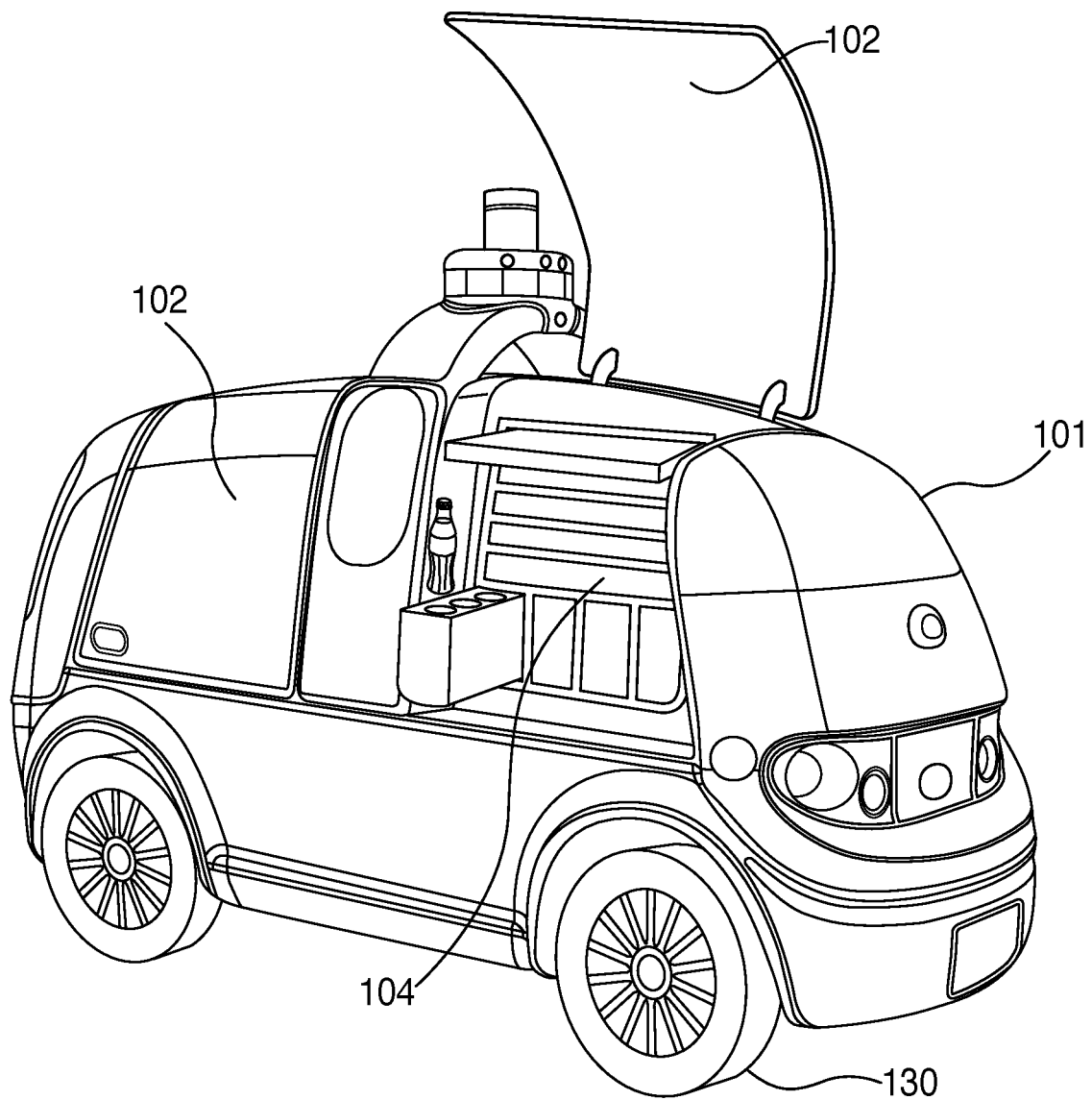
FIG. 2 is an exemplary ISO view of a robot vehicle, part of an autonomous robot fleet, illustrating securable compartments within the vehicle.
Figure 3:
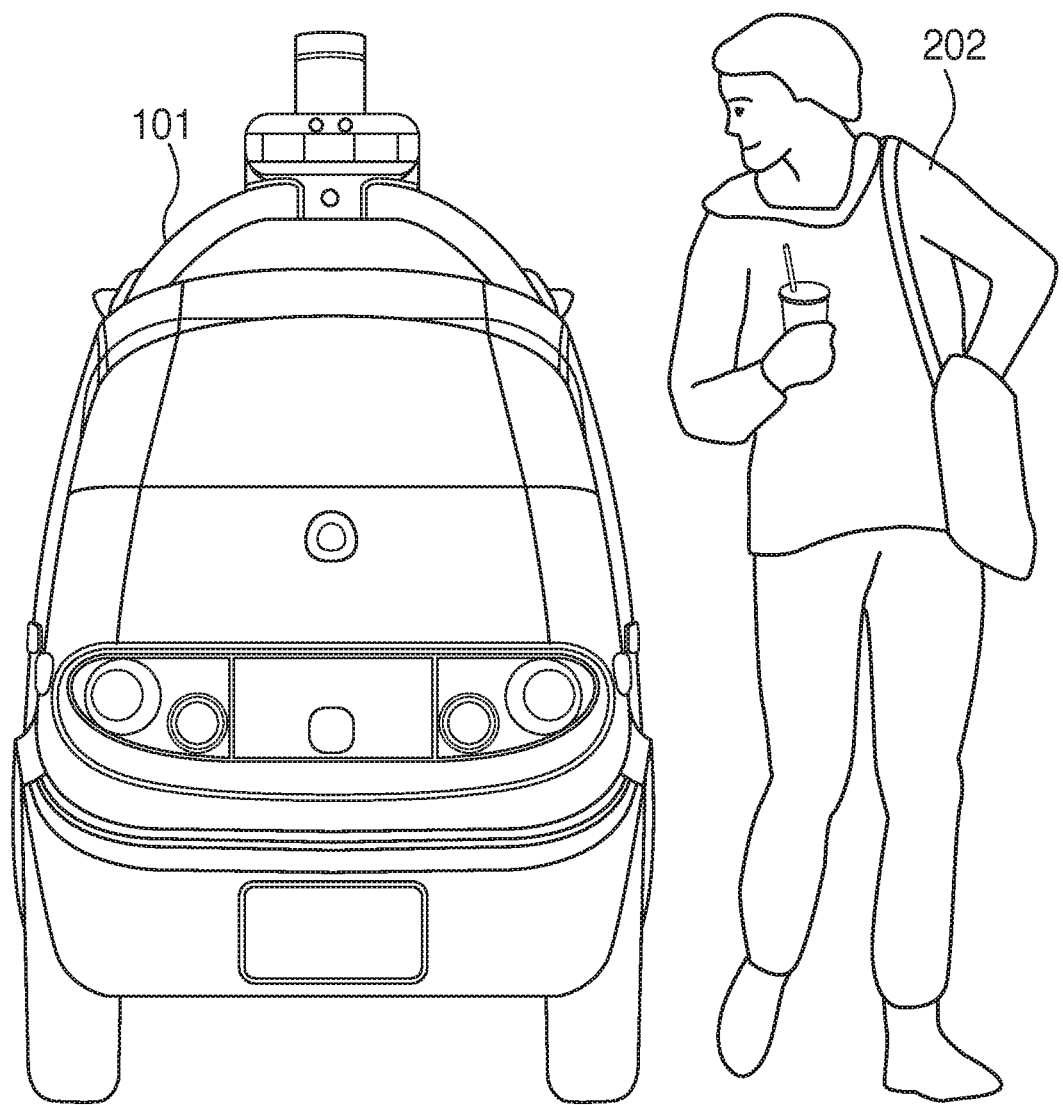
FIG. 3 is an exemplary front view of a robot vehicle, part of an autonomous robot fleet, shown in comparison to the height of an average person.
Figure 4:
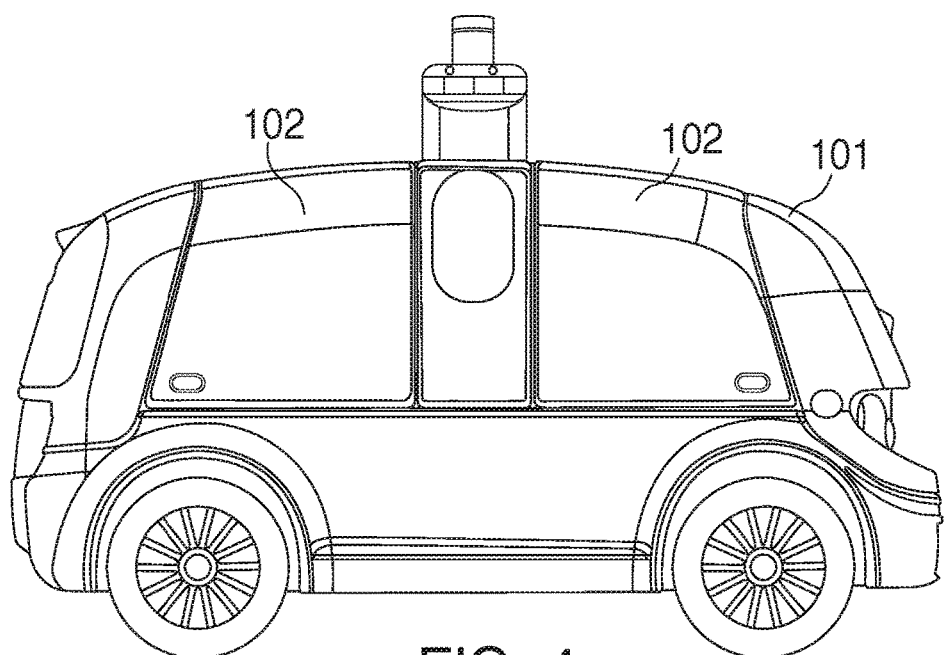
FIG. 4 is an exemplary right side view of a robot vehicle, part of an autonomous robot fleet, illustrating a configuration with two large side doors, each enclosing securable compartments.
Figure 5:
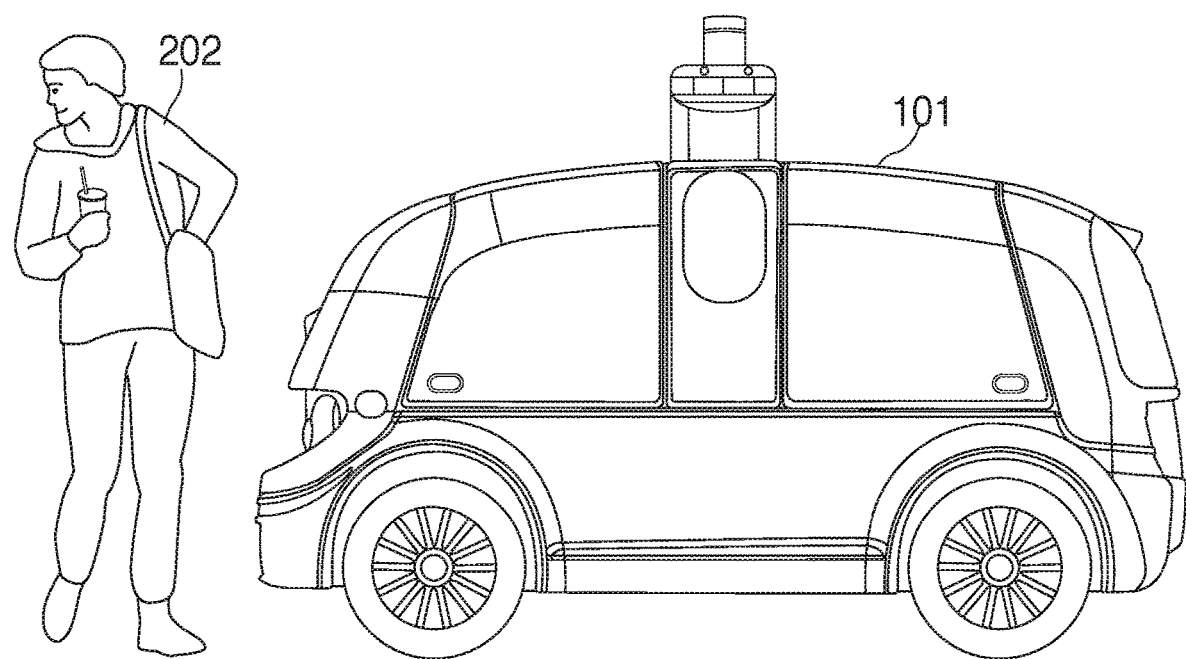
FIG. 5 is an exemplary left side view of a robot vehicle, part of an autonomous robot fleet, shown in comparison to the height of an average person.
Figure 6:
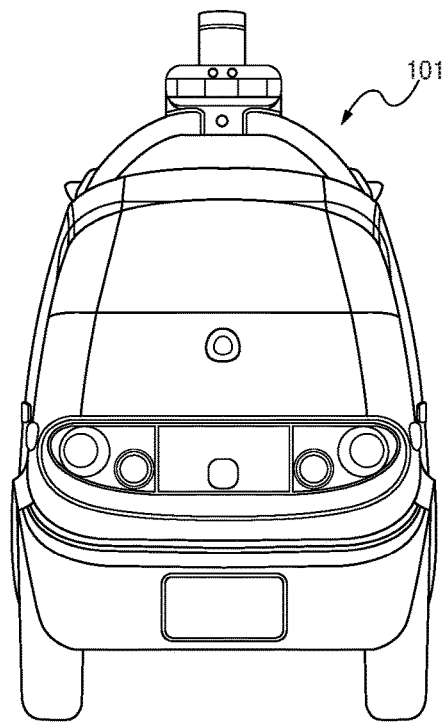
FIG. 6 is an exemplary rear view of a robot vehicle, part of an autonomous robot fleet.
Figure 7:
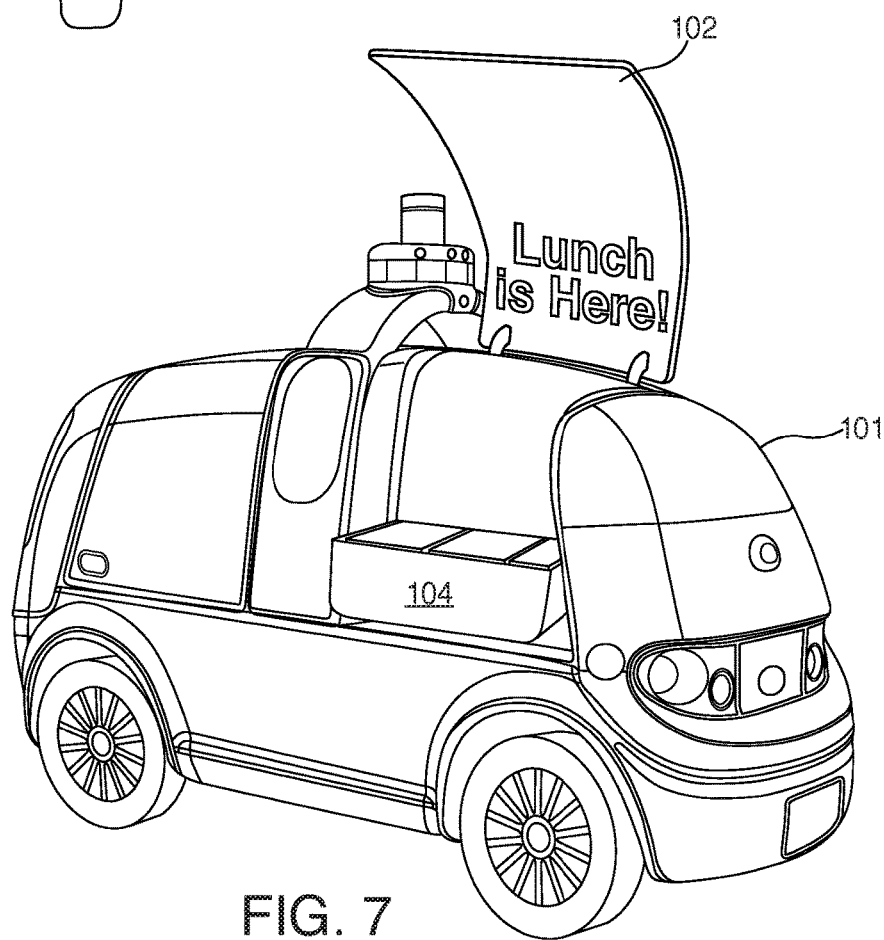
FIG. 7 is an exemplary ISO view of a robot vehicle, part of an autonomous robot fleet, illustrating an autonomous lunch delivery vehicle for any branded company.

As illustrated in FIG. 2, robots in the fleet are each configured for transporting, delivering or retrieving goods or services and are capable of operating in an unstructured open environment or closed environment. In some embodiments, the vehicle 101 is configured to travel practically anywhere that a small all-terrain vehicle could travel on land, while providing at least one and preferably two large storage compartments 102, and more preferably, at least one large compartment 102 is configured with smaller internal secure compartments 104 of variable configurations to carry individual items that are to be delivered to, or need to be retrieved from customers.

Alternately, in some embodiments, the vehicle could be configured for providing at least one and preferably two large storage compartments, and more preferably, at least one large compartment is configured with smaller internal secure compartments of variable configurations to carry individual items that are to be delivered to, or need to be retrieved from customers.

Further still, in some embodiments, the vehicle could be configured for hover travel, providing at least one and preferably two large storage compartments, and more preferably, at least one large compartment is configured with smaller internal secure compartments of variable configurations to carry individual items that are to be delivered to, or need to be retrieved from customers.

Further still, in some embodiments, the vehicle could be configured for aerial drone or aerial hover travel, providing at least one and preferably two large storage compartments, and more preferably, at least one large compartment is configured with smaller internal secure compartments of variable configurations to carry individual items that are to be delivered to, or need to be retrieved from customers.

Figure 8:
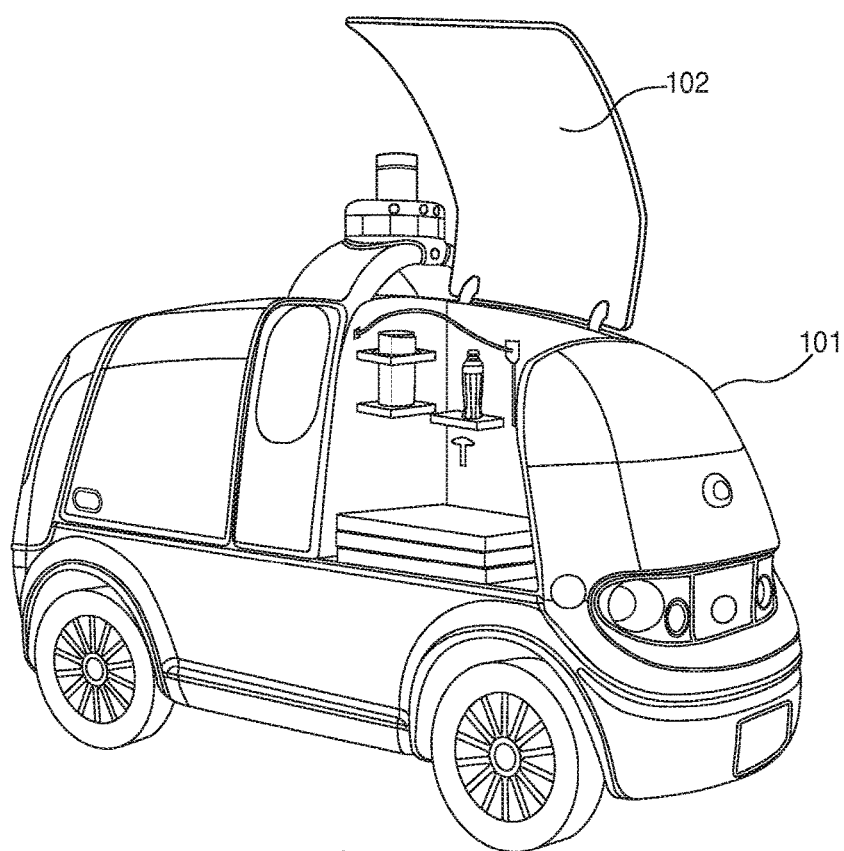
FIG. 8 is an exemplary ISO view of a robot vehicle, part of an autonomous robot fleet, illustrating an autonomous pizza delivery vehicle for any branded company.
Figure 9:
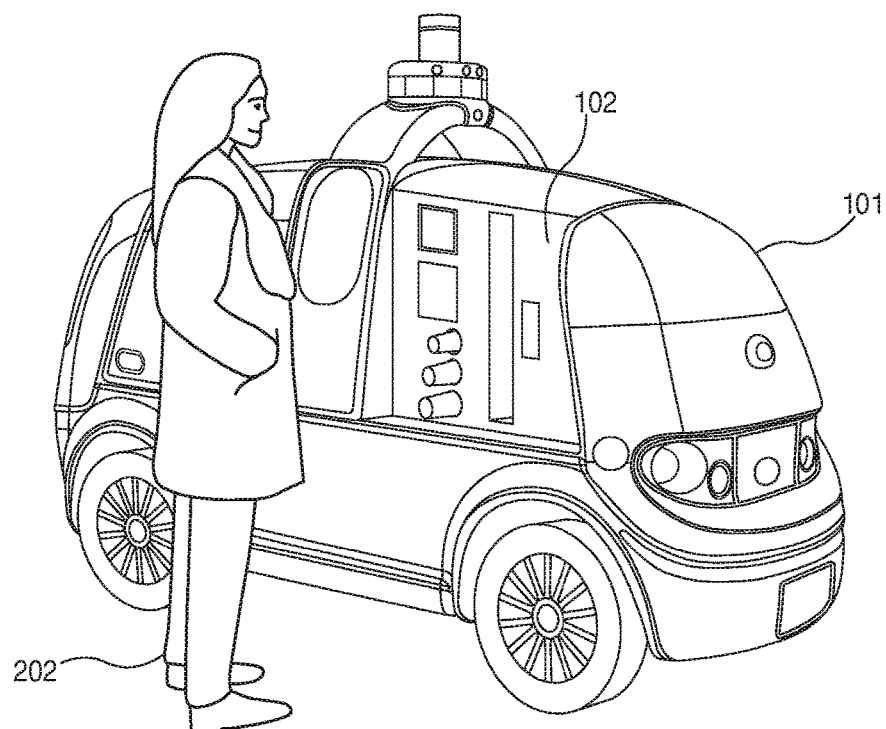
FIG. 9 is an exemplary ISO view of a robot vehicle, part of an autonomous robot fleet, illustrating an autonomous coffee delivery vehicle for any branded company.
Figure 10:
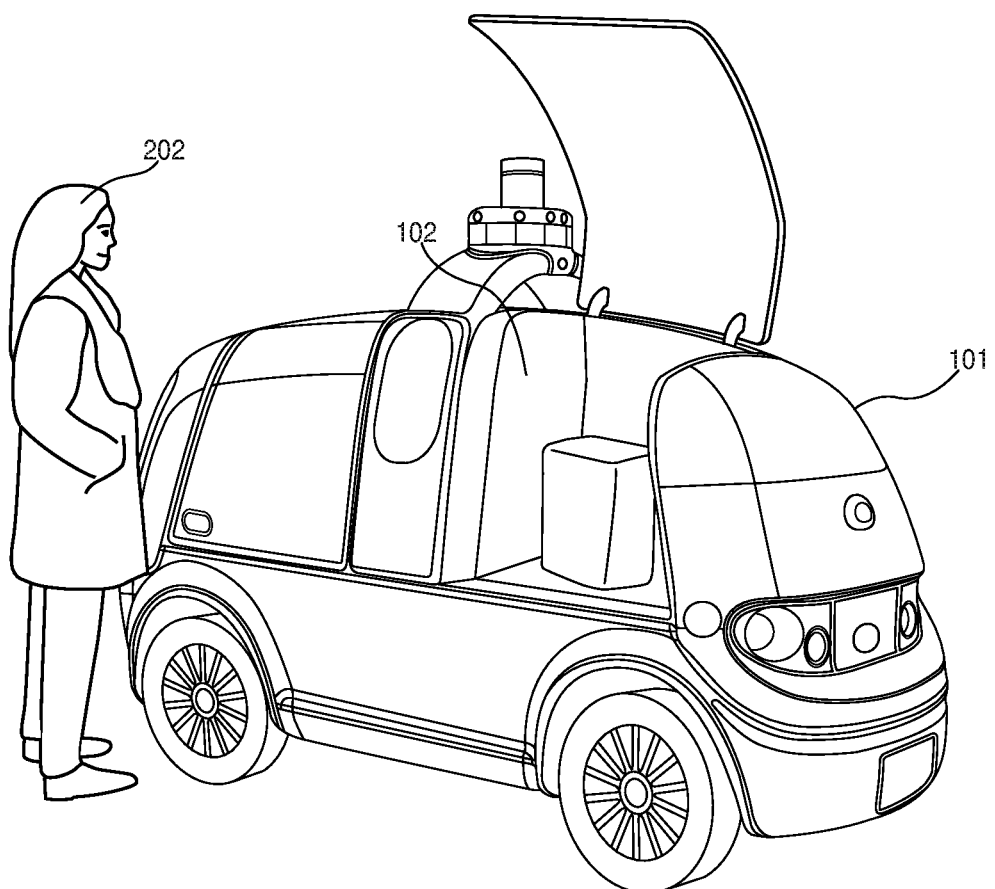
FIG. 10 is an exemplary ISO view of a robot vehicle, part of an autonomous robot fleet, illustrating an autonomous evening/nighttime delivery vehicle for any branded company, comprising a lighted interior.

As illustrated in FIGS. 7-10, in some embodiments, the securable compartments are humidity and temperature controlled for, for example, hot goods, cold goods, wet goods, dry goods, or combinations or variants thereof. Further still, as illustrated in FIGS. 8-10, the compartment(s) are configurable with various amenities, such as compartment lighting for night deliveries and condiment dispensers.

In some embodiments, the securable compartments are configurable for various goods. Such configurations and goods include: bookshelves for books, thin drawers for documents, larger box-like drawers for packages, and sized compartments for vending machines, coffee makers, pizza ovens and dispensers.

In some embodiments, the securable compartments are variably configurable based on: anticipated demands, patterns of behaviors, area of service, or types of goods to be transported.

Further still, each robot includes securable compartments to hold said goods or items associated with said services, and a controller 150 configurable to associate each one of the securable compartments 102, 104 to an assignable customer 202 or provider 204 and provide entry when authorized. Each robot vehicle further includes at least one processor configured to manage the conveyance system, the navigation module, the sensor system, instructions from the fleet management module, the communication module, and the controller.

As described previously, each robot is configured with securable compartments. Alternately, a robot is configurable to contain a set of goods or even a mobile marketplace (similar to a mini bar at a hotel).

When a robot is assigned to a customer 202, one or more of the compartments 102, 104 is also assigned to that customer. Each of the large compartments 12 is secured separately and can securely transport goods to a separate set of customers 202.

Upon arrival of the robot to the customer destination, the customer can then open their respective compartment(s) by verifying their identity with the robot. This can be done through a wide variety of approaches comprising, but not limited to:

1. The customers can be given a PIN (e.g., 4 digit number) when they make their initial request/order. They can then enter this pin at the robot using the robot touchscreen or a keypad.
2. The customers can verify themselves using their mobile phone and an RFID reader on the robot.
3. The customers can verify themselves using their voice and a personal keyword or key phrase they speak to the robot.
4. The customers can verify themselves through their face, a government ID, or a business ID badge using cameras and facial recognition or magnetic readers on the robot.
5. The customers can verify themselves using their mobile phone; by pushing a button or predetermined code on their phone (and the system could optionally detect the customer is near the robot by using their GPS position from phone)

In various embodiments, the interior space of each robot vehicle is configured to fill the interior space with securable compartments, such that the robot vehicles do not include any interior space for a human operator to operate the autonomous vehicle from within the vehicle. Rather, as explained below in connection with FIGS. 13-17, a human operator can remotely operate the autonomous vehicle.

Controller(s) and Processor(s)

In some embodiments, each robot in the robot fleet is equipped with one or more processors 125 capable of both high-level computing for processing as well as low-level safety-critical computing capacity for controlling the hardware. The at least one processor is configured to manage the conveyance system, the navigation module, the sensor system, instructions from the fleet management module, the communication module and the controller.

Further still, in some embodiments, each robot in the robot fleet is equipped with a controller 150 configurable to associate each one of the securable compartments 102, 104 to an assignable customer 202 or provider 204 and provide entry when authorized.

The following will now describe control and processing in connection with remote operation of the robot vehicle by a human operator. As mentioned above, remote operation of a fully-autonomous or a semi-autonomous vehicle may be appropriate in various situations. The capability for a human operator to remotely operate an autonomous vehicle is beneficial even where the autonomous vehicle can be locally operated by a human operator. This capability becomes much more important where the interior space of the autonomous vehicle is configured to maximize commercial carrying capacity and includes no space for a human operator to locally operate the vehicle from within the autonomous vehicle.

In various embodiments, an autonomous vehicle in accordance with aspects of the present disclosure includes an interior space to hold a human operator to locally control the autonomous vehicle, but the vehicle can also be controlled remotely by a remote human operator. In various embodiments, an autonomous vehicle in accordance with aspects of the present disclosure includes no interior space to hold a human operator to locally control the autonomous vehicle. Rather, in accordance with aspects of the present disclosure, a human operator can remotely operate the autonomous vehicle. Such a configuration provides unique considerations. In contrast to an existing configuration in which a human operator located in an autonomous vehicle can override the autonomous operation and take over manual operation to avoid a hazard, various embodiments of the present disclosure do not include space in an autonomous vehicle for a human operator. Aspects of the present disclosure provide systems and methods for an autonomous vehicle to request a remote human operator and for a remote human operator to be assigned to the autonomous vehicle based on various factors.

Referring now to FIG. 12, and as described above herein, an autonomous vehicle includes a processor 125 and a controller 150 for controlling various systems and modules of the autonomous vehicle and includes a communication module 160 for communicating with external systems. In one aspect of the present disclosure, the communication module 160 can communicate with a remote human operator system, which can be part of or separate from the fleet management module 120.

Figure 13:
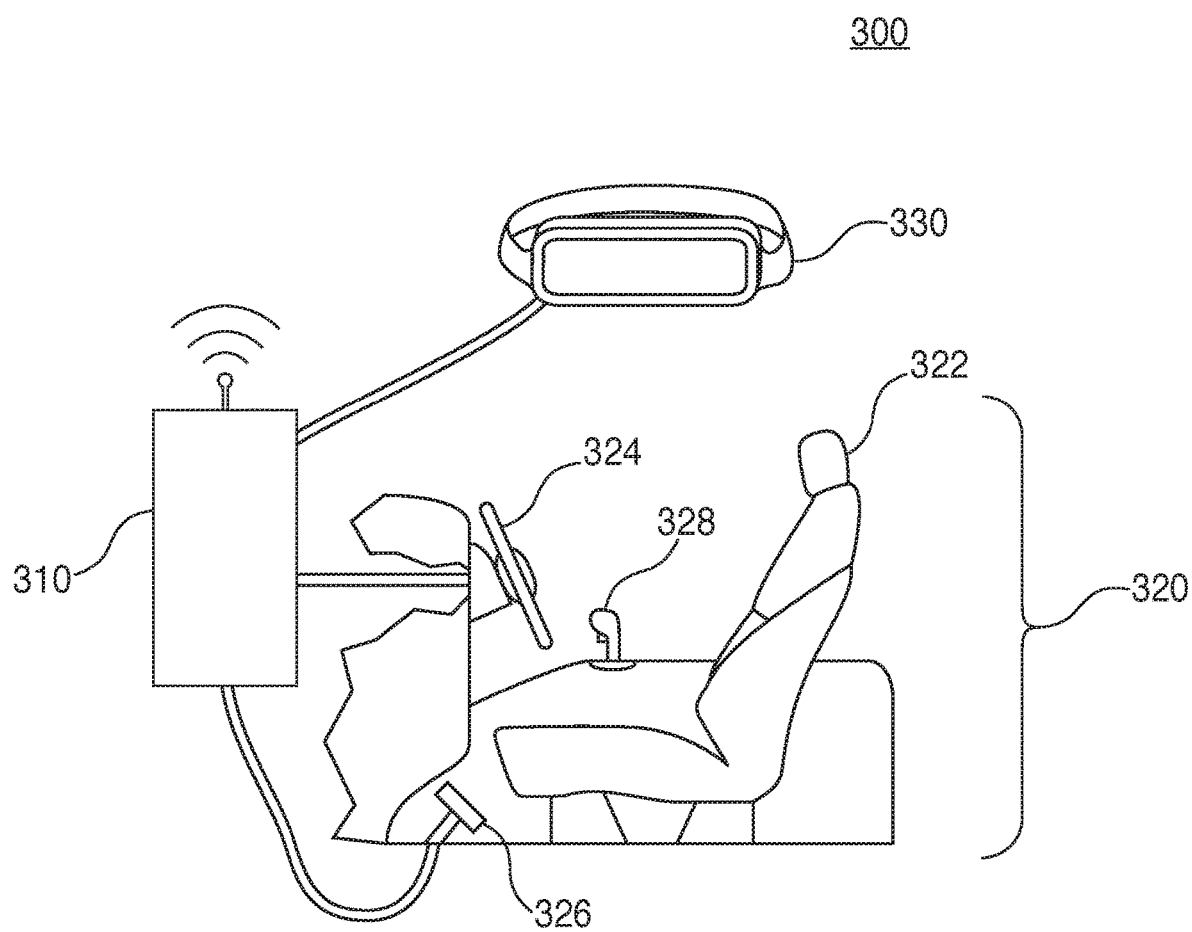
FIG. 13 is a diagram of an exemplary remote human operator system.

FIG. 13 shows an exemplary embodiment of a remote human operator system 300, which includes communication/processing equipment 310 and a human operator station 320. The human operator station 320 can resemble a driver station in a typical automobile and can include a driver seat 322, a steering wheel 324, acceleration and brake pedals 326, a gear shifter 328, and a visual display 330. In the illustrated embodiment, the visual display 330 is in the form of a virtual-reality (VR) or augmented-reality (AR) headset. In various embodiments, the visual interface can include one or more display screens, such as LED, LCD, and/or OLED display screens. In various embodiments, the human operator station 320 can be configured to have the approximate touch response of an actual driver station in an automobile. For example, the steering wheel 324 can be configured to have the touch response of power steering in an automobile, and the pedals 326 can be configured to approximate the resistance of pedals in an actual automobile.

The instruments 324-328 of the human operator station 320 can be connected or coupled to communication/processing equipment 310, which enables communication between the human operator station 320 and the autonomous vehicle. In the illustrated embodiment, the human operator station 320 is connected to the communication/processing equipment 310 by physical cables. In various embodiments, the human operator station 320 can be wirelessly coupled to the communication/processing equipment 310 using technologies such as Bluetooth. In various embodiments, the human operator station 320 need not be directly connected to the communication/processing equipment 310 and can be coupled to the communication/processing equipment 310 through intermediate devices and/or networks.

In various embodiments, the communication/processing equipment 310 can establish communications using various communications technologies, including, for example, IEEE 802.11x (WiFi), cellular 3G/4G/5G, wired communications, and/or other wired or wireless communication protocols. The communication/processing equipment 310 includes one or more processors, memories, machine instructions, and/or hardware for processing visual information for display by the visual display 330. Persons skilled in the field will recognize various ways of communicating, processing, and displaying visual information.

The communication/processing equipment 310 also processes signals from the human operator station 320 and translates them into control instructions for controlling the autonomous vehicle, such as control instructions for controlling the conveyance system (130, FIG. 12) of the autonomous vehicle to perform travel. In this manner, when the human operator turn turns the steering wheel 324, the communication/processing equipment 310 sends corresponding control instructions to the autonomous vehicle to instruct the vehicle to turn. As another example, when the human operator accelerates or brakes using the pedals 326 of the human operator station 320, the communication/processing equipment 310 sends corresponding control instructions to the autonomous vehicle to instruct the vehicle to accelerate or brake, respectively. The embodiments and configurations of FIG. 13 are exemplary, and other configurations and variations are contemplated to be within the scope of the present disclosure. For example, where the autonomous vehicle is a rail vehicle, the remote human operator system 300 may have a human operator station 320 that reflects the actual operator station on a typical non-autonomous vehicle of the same or similar type.

Figure 14:
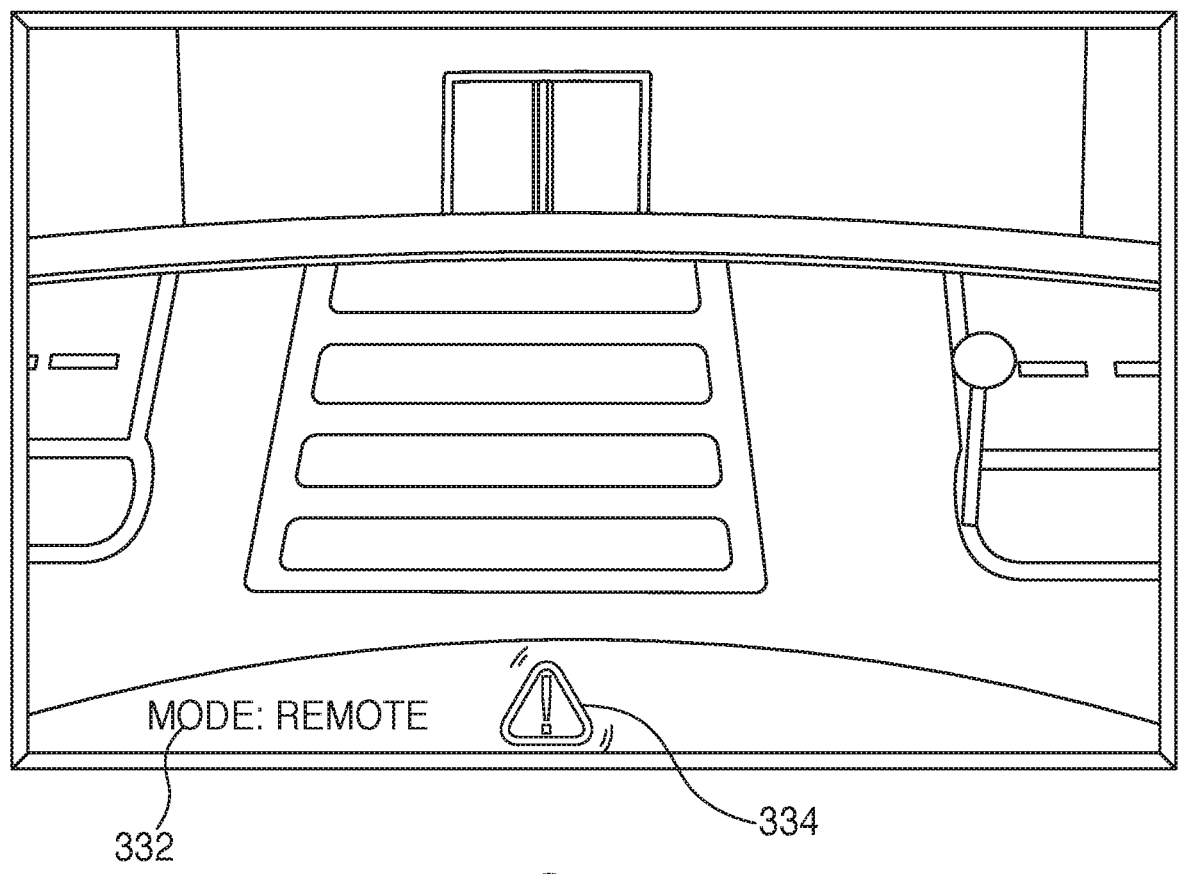
FIG. 14 is a diagram of an exemplary visual display of the remote human operator system of FIG. 13.

Referring also to FIG. 14, there is shown a diagram of an exemplary visual display, which can be displayed in a VR/AR headset or on a display screen, or otherwise. As described above herein, each robot vehicle is equipped with a sensor system which can include cameras, such as for example, those running at a high frame rate akin to video, and other sensors, and include internal computer processing to determine what other objects are around each robot vehicle. In accordance with aspects of the present disclosure, this visual information captured by the sensor system of the autonomous vehicle can be processed and communicated to the remote human operator system 300 for display on the visual display 330. In various embodiments, the visual display can present the autonomous vehicle's surrounding environment from the point of view of the human operator, such that the displayed content turns as the driver's head turns. In various embodiments, the human operator station 320 can include multiple display screens (not shown) that surround the human operator station, and the display screens can simultaneously display the surrounding environment of the autonomous vehicle. Other configurations and variations are contemplated to be within the scope of the present disclosure.

Figure 15:
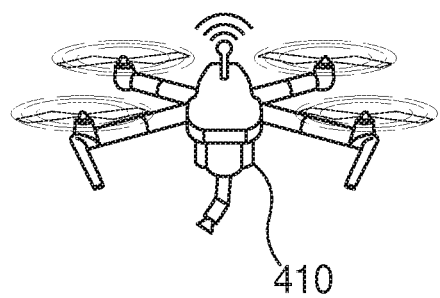
FIG. 15 is a diagram of an exemplary configuration of visualizing an autonomous land vehicle by an autonomous aerial vehicle.
Figure 15:
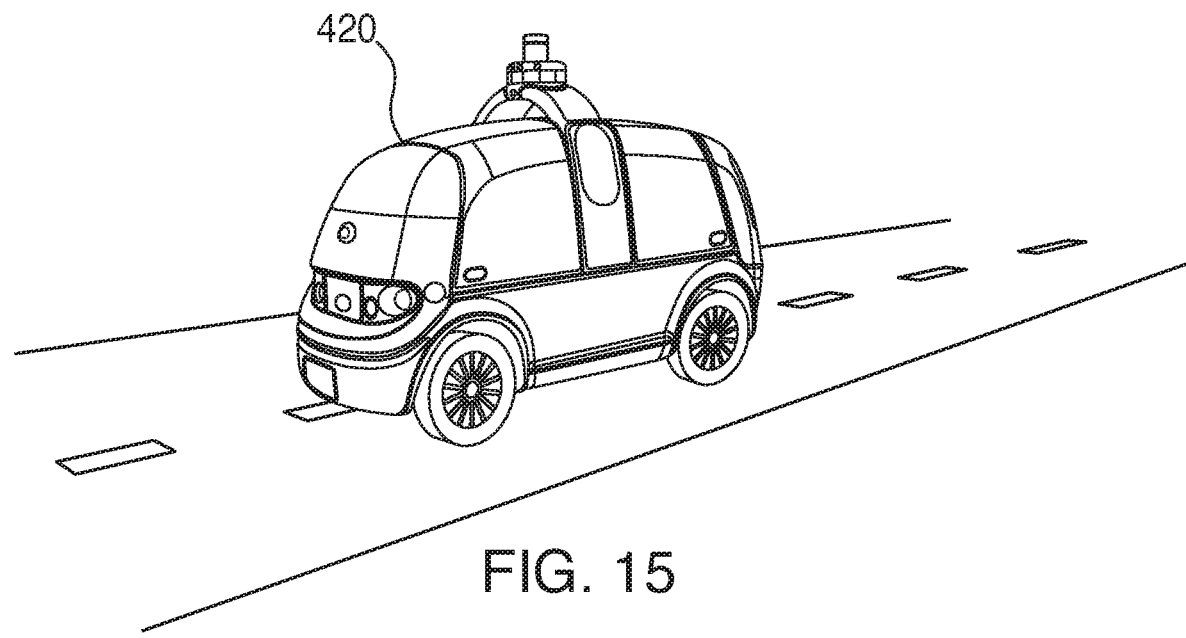

For example, in various embodiments, the visual display can present a bird's eye view (not shown) of the autonomous vehicle. Referring also to FIG. 15, in various embodiments, an autonomous aerial vehicle 410 can be associated with one or more autonomous land vehicles 420 and can capture images or videos of the autonomous land vehicle 420 from a bird's eye perspective. The captured images or videos can be communicated to the remote human operator system 300 for display on a visual display 330. In this manner, the bird's eye perspective allows the human operator to easily visualize the surrounding environment of the autonomous vehicle 420 to better operate the autonomous vehicle 420 remotely.

In various embodiments, the autonomous aerial vehicle 410 can fly at an altitude that is free of obstacles such as traffic lights or expressway overpasses, among other things. In various embodiments, the visual information provided by the autonomous aerial vehicle can be processed to zoom in on the surroundings of the autonomous land vehicle 420 to different degrees. In various embodiments, the autonomous aerial vehicle 410 can track the movement of the autonomous land vehicle 420, but can disengage if it is unable to track the movement safely, such as when the autonomous land vehicle 420 enters a tunnel. In various embodiments, there may be a fleet of roving autonomous aerial vehicles 410 that can dynamically associate an autonomous aerial vehicle 410 with a particular land vehicle 420. Such a dynamic association can be communicated to the remote human operator system 300, so that the remote human operator system 300 can switch between the visual information provided by the autonomous land vehicle 420 and the visual information provided by the autonomous aerial vehicle 410, while still maintaining remote operation of the autonomous land vehicle 420.

With continuing reference to FIG. 14, the visual display can include various indicators that inform the human operator of certain conditions. As an example, the visual display can include a mode indicator 332 to specify whether the autonomous vehicle is operating in autonomous mode or in remote operation mode. In the autonomous mode, the human operator's interactions with the human operator station 320 do not affect the movement of the autonomous vehicle 420. In the remote operation mode, the human operator controls the movement of the autonomous vehicle 420 by interacting with the human operator station 320. In various embodiments, the human operator station can include a mechanism (not shown) for switching between autonomous mode and remote operation mode, such as a physical switch or a touch interface button, a voice-activated command, or another mechanism. The illustrated visual display also includes a warning indicator 334 that can alert the human operator to various conditions. In various embodiments, the warning indicator 334 can alert the human operator of a loss of communication or a weak or unstable connection between the human operator station 320 and the autonomous vehicle 420. For example, the warning indicator 334 can appear if a loss of communication occurs for a period of time, such as three seconds or another period of time. In various embodiments, the warning indicator 334 can appear if the communication connection exhibits high latency, high error rate, or high rate of packet loss, where the degree that qualifies as "high" can be a degree that exceeds a predetermined threshold.

The layout and configuration of the visual display of FIG. 14 is merely exemplary, and variations are contemplated to be within the scope of the present disclosure. For example, where the autonomous vehicle is a rail vehicle, the visual interface of the remote human operator system 300 can be tailored to the visual elements for operating such a vehicle.

With continuing reference to FIG. 14, in various embodiments, the visual display 330 of the human operator system 300 can highlight objects on the visual display relating to a potential hazard condition, such as highlighting traffic lights or road signs or displaying them as graphical icons. In various embodiments, the visual display 330 of the human operator system 300 highlights other potential hazard conditions, such as surrounding objects such as vehicles, pedestrians, cyclists, obstacles, lights, signs, lane lines, turning lanes, and curbs, among other things. These features can be dynamically performed by the autonomous vehicle and/or the remote human operator system 300 based on detected objects. In various embodiments, the autonomous vehicle and/or the remote human operator system 300 can determine a recommended path around surrounding objects and can provide indications to the human operator as a guide for the recommended path. In various embodiments, the indications can include haptic feedback through steering wheel of the remote human operator system and/or a projected path displayed onto the visual display 330.

Other variations are contemplated to be within the scope of the present disclosure. For example, in various embodiments, the visual display 330 of the human operator system 300 can display the speed limit. In various embodiments, the visual display 330 of the human operator system 300 can display a tailgater and/or rear collision warning. For example, the warning can be displayed when a tailgating vehicle is following too closely based on its vehicle speed and the speed of the autonomous vehicle, and/or when the remote human operator applies the brakes and there is a following vehicle or tailgater that could cause a rear collision.

In various embodiments, the visual display 330 of the human operator system 300 can display a warning message 334 when poor communication connections or conditions are detected. In various embodiments, the visual display 330 of the human operator system 300 can display a warning message 334 when an unusual or anomalous situation is detected, such as, for example, an accident, police directing traffic, road closure, or parade, among other things.

In various embodiments, the visual display 330 of the human operator system 300 can display navigation directions (not shown), such as directional arrows overlaid onto the displayed environment of the autonomous vehicle. In various embodiments, the navigation directions can be two-dimensional pictorial representations of the roadways displayed in a particular region of the visual display 330, such as top-left region of the visual display 330 or another region.

Referring again to FIG. 12, an in accordance with aspects of the present disclosure, an autonomous vehicle can be configured to determine when a remote human operator should be requested based on captured information. As described above herein, the sensor system 170 can capture information about the surrounding environment of the autonomous vehicle. For example, the sensor system 170 can include a high frame-rate camera that captures images and/or videos of the surrounding environment. Other information can be captured, such as LiDAR information or other sensor information. In various embodiments, the sensor system 170 can capture information about the functioning of vehicle systems and modules, such as proper functioning of the navigation system or power system. For example, the navigation system can be tested based on GPS functionality, and the power system can be tested based on voltage sensors. The processor 125 can analyze the captured information and determine whether there is any condition or situation that would warrant requesting a remote human operator. If the processor 125 determines that a remote human operator should be requested, the autonomous vehicle makes a request to a remote human operator management system via the communication module 160. The remote human operator system will be described in more detail herein in connection with FIG. 17.

Figure 16:
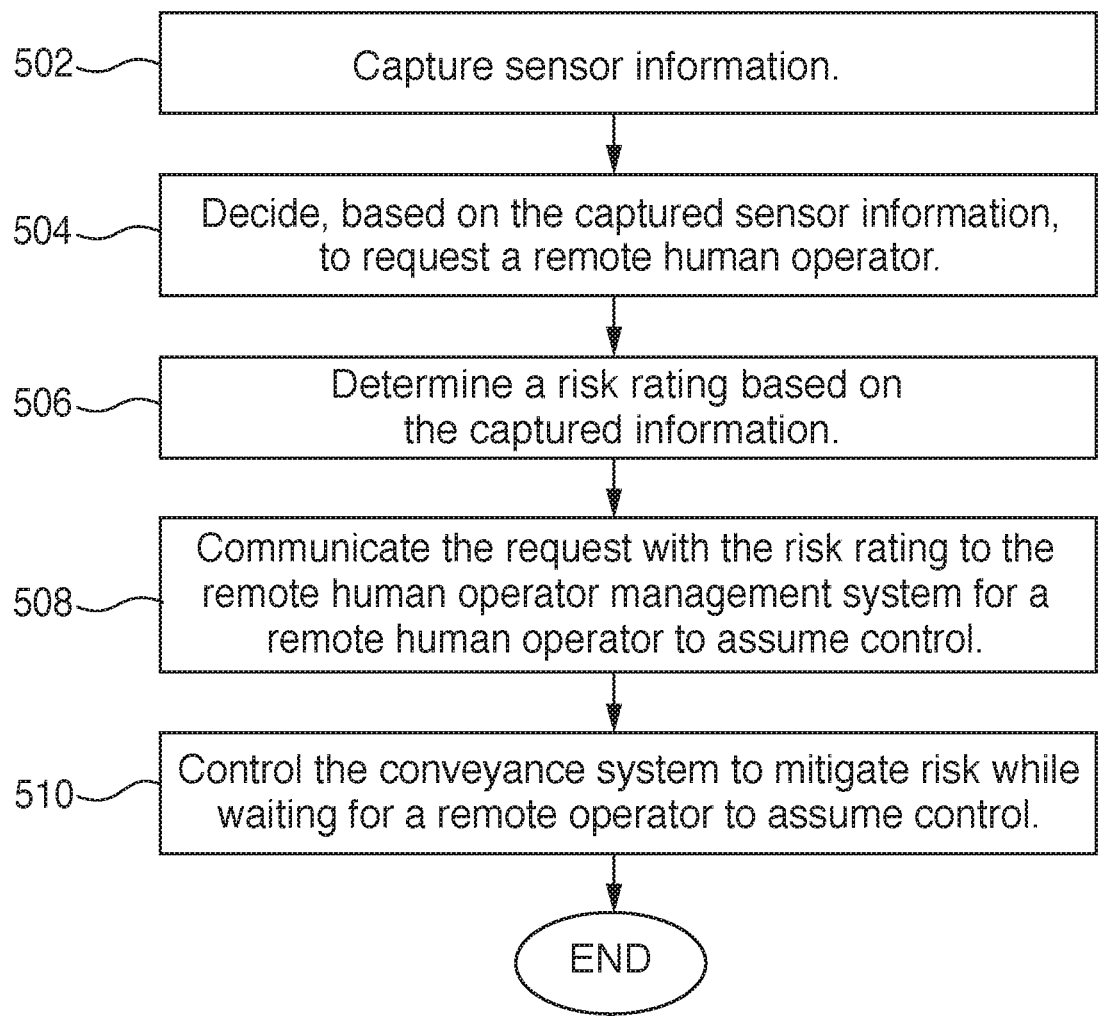
FIG. 16 is a flow chart of an exemplary operation of an autonomous vehicle for requesting a remote human operator to assume control.

FIG. 16 shows a flow diagram of an exemplary operation of an autonomous vehicle for requesting a remote human operator. At step 502, the autonomous vehicle captures sensor information. In various embodiments, the captured sensor information can include surrounding environment information and/or vehicle subsystem information. At step 504, the autonomous vehicle decides, based on the captured sensor information, to request a remote human operator. In various embodiments, the autonomous vehicle can decide to request a remote human operator based on a vehicle subsystem not functioning properly, such as the navigation subsystem. In various embodiments, the autonomous vehicle can decide to request a remote human operator based on not recognizing the surrounding environment situation. For example, the autonomous vehicle may not recognize an object in the surrounding environment, such as a temporary road block, and may request a remote human operator to assume control of the vehicle. In various embodiments, the autonomous vehicle may recognize the surrounding environment and decide that the surrounding environment situation should not be handled autonomously. For example, the autonomous vehicle may decide to request a remote human operator when it determines that an emergency services vehicle is signaling an emergency, a human is directing traffic, there is construction, traffic pattern has been modified or disrupted, weather conditions are unsafe, and/or there is an excessive number of pedestrians or vehicles, among other situations. Persons skilled in the art will understand techniques for identifying objects in the surrounding environment of an autonomous vehicle, including machine learning techniques. In various embodiments, an excessive number of pedestrians or vehicles can be determined based on the number of pedestrians or vehicles exceeding a threshold number.

In various embodiments, the autonomous vehicle may decide to request a remote human operator when it cannot autonomously determine the next maneuver to select or execute. For example, the autonomous vehicle may recognize all objects and situations, but may be unable to resolve which maneuver to execute next. Some situations may include, for example, particularly difficult construction areas or inclement weather conditions, among other situations.

In various embodiments, the autonomous vehicle may decide to request a remote human operator when it encounters a predetermined situation or a predetermined roadway. For example, the predetermined situations or the predetermined roadways may include particularly difficult roads, particular types of turns, or presence of an emergency vehicle, among other situations or roadways. In various embodiments, the autonomous vehicle may decide to request a remote human operator when it does not recognize a situation involving a subsystem of the vehicle. In various embodiments, the autonomous vehicle may decide to request a remote human operator when it travels outside a predetermined operating geography. For example, accidents or construction may force the vehicle to take detours and travel outside a designated operating geography. In various embodiments, the autonomous vehicle may decide to request a remote human operator when multiple attempts to execute an autonomous maneuver have failed. For example, such a situation may occur if the vehicle attempts to make an unprotected left turn but has not done so after a certain number of minutes. The situations described above are exemplary, and other situations are contemplated for requesting a remote human operator.

At step 506, the autonomous vehicle determines a risk rating based on the captured information. The risk rating can depend on the particular situation reflected by the captured information. In various embodiments, the risk rating can include three levels: a low risk rating, a high risk rating, and a moderate risk rating. In various embodiments, the risk rating can include two levels or more than three levels.

In various embodiments, the autonomous vehicle can determine a risk rating based on how much time may be available to safely react to the situation. The autonomous vehicle can access risk mitigation procedures, estimate the probability of success in executing the risk mitigation procedures, and determine the risk rating based on the estimated probability of success. In various embodiments, the risk mitigation procedures can include finding a spot to pull over, finding an easier or slower street to travel on while waiting for a remote human operator, or stopping on a roadway without interfering with traffic, among other procedures. In various embodiments, estimating the probability of success in executing the risk mitigation procedure can be based on one or more factors, such as, for example, road speed limits, current vehicle speed, current speed of surrounding vehicles, number of surrounding vehicles, number of surrounding pedestrians, number of surrounding objects, road width, weather conditions, available time to react, and/or proximity to surrounding vehicles. In various embodiments, other factors can be considered. In various embodiments, a lower probability of success can correspond to a higher risk rating, and a higher probability of success can correspond to a lower risk rating. Accordingly, the autonomous vehicle can determine the risk rating dynamically and multi-dimensionally.

As an example, where an emergency vehicle attempts to pass by and the autonomous vehicle is on a slow road with a clear space to pull over, the risk rating can be determined to be a low risk rating. As another example, where a sub-system of the autonomous vehicle malfunctions on a high speed road without room to pull over, the risk rating can be determined to be a highest risk.

At step 508, the autonomous vehicle communicates the request to the remote human operator management system for a remote human operator to assume control. The request includes the risk rating and at least a portion of the captured information. For example, if the captured information contains image or video information, at least some of the images or a portion of the video can be communicated to the remote human operator management system. The remote human operator management system, which will be described in more detail in connection with FIG. 17, can utilize risk rating and/or the captured information in the request to assign a remote human operator to the request. In various embodiments, the request can include further information, such as location information and/or information indicating the particular situation prompting the request for a remote human operator. In various embodiments, the request can include information indicating that a vehicle subsystem is not functioning properly, or information indicating that an emergency services vehicle is signaling an emergency, a human is directing traffic, and/or there is an excessive number of pedestrians or vehicles, among other situations.

At step 510, the autonomous vehicle can control the conveyance system to mitigate risk while waiting for a remote human operator to assume control. In various embodiments, the autonomous vehicle can evaluate different ways to mitigate risk, including parking at a curb, parking in a parking lot, traveling on roadways in search of parking, traveling at a slower speed than the travel speed without the risk; or departing from a planned route to a roadway having lower risk. Other ways to mitigate risk are contemplated, such as stopping completely in place or following other vehicles until a remote human operator assumes control. The autonomous vehicle can determine and carry out the most effective option to mitigate risk for the situation. For example, if the situation involves the navigation system not functioning properly, the autonomous vehicle can park at a curb or travel on roadways in search of parking. If the situation involves an emergency services vehicle signaling an emergency, the autonomous vehicle can follow the vehicle in front of it. If the situation involves a human directing traffic, the autonomous vehicle can travel at a slow speed. If the situation involves an excessive number of pedestrians or vehicles, the autonomous vehicle can stop in place. The risk mitigation options and choices described above are exemplary, and other risk mitigation options and choices are contemplated.

Referring again to step 506, in various embodiments, the autonomous vehicle can determine the risk rating based also on the available risk mitigation options. For example, if there is at least one risk mitigation option that can be safely performed, the risk rating can be decreased. On the other hand, if there is no risk mitigation option that can be safely performed, the risk rating can be increased.

The operation of FIG. 16 is exemplary, and other implementations are contemplated for requesting a remote human operator and for mitigating risk while waiting for a remote human operator to assume control.

Figure 17:
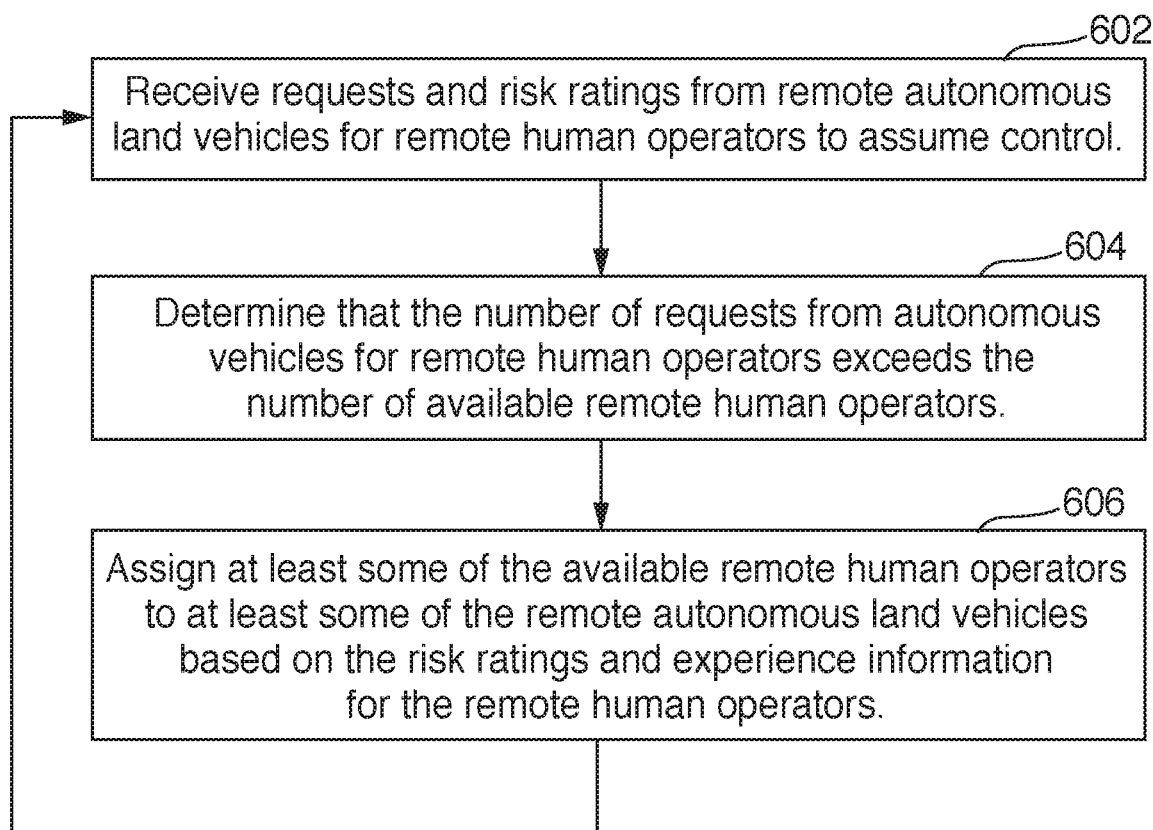
FIG. 17 is a flow chart of an exemplary operation of a remote human operator management system for assigning remote human operators to autonomous vehicles.

Referring now to FIG. 17, there is shown a flow diagram of an exemplary operation of a remote human operator management system. The remote human operator management system communicates with autonomous vehicles and remote human operator systems (300, FIG. 13), and operates to assign remote human operators to autonomous vehicles that request a remote human operator. In accordance with aspects of the present disclosure, the remote human operator management system includes or has access to a database of experience information on remote human operators. The experience information can include information such as a remote human operator's experience driving in particular regions, such as particular states, cities, towns, or neighborhoods, and/or experience handling particular situations, such as when a vehicle subsystem is not functioning properly, when an emergency vehicle is signaling an emergency, when a human is directing traffic, and/or when there is an excessive number of pedestrians or vehicles, among other situations.

In various embodiments, and with reference also to FIG. 11, the remote human operator management system and/or the database can be part of the central server 110 and/or the fleet management module 120. In various embodiments, the remote human operator management system and/or the database can be separate from the central server 110 and the fleet management module 120.

With continuing reference to FIG. 17, at step 602, the remote human operator management system receives requests from remote autonomous land vehicles for remote human operators to assume control. As described above, each request can include a risk rating generated by the corresponding remote autonomous land vehicle and can include other information such as information captured by the sensor system, location information, and/or information indicating a particular situation. In various embodiments, the requests may not include a risk rating but can include risk information generated by the autonomous vehicle. In such situations, the remote human operator management system can determine a risk rating based on the risk information generated by the autonomous vehicle. At step 604, the remote human operator management system determines that the number of requests from autonomous vehicles for a remote human operator exceeds the number of available remote human operators. At step 606, the remote human operator management system assigns at least some of the available remote human operators to at least some of the remote autonomous land vehicles based on the risk ratings and/or the experience information in the database. In various embodiments, the remote human operator management system prioritizes the assignment of available remote human operators to autonomous vehicles having the highest risk rating. In various embodiments, the remote human operator management system can assign remote human operators who have more experience to the highest risk ratings. In various embodiments, the remote human operator management system can assign available remote human operators who have experience driving in particular regions to remote autonomous vehicles located in those regions. In various embodiments, the remote human operator management system can assign available remote human operators who have experience handling vehicle subsystem failures to remote autonomous vehicles experience subsystem failures. In various embodiments, the remote human operator management system can assign available remote human operators who have experience with particular situations to remote autonomous vehicles facing such situations. For example, the situations can include an emergency vehicle signaling an emergency, a human directing traffic, and/or an excessive number of pedestrians or vehicles. Such experience information can be stored in the database, as described above.

The operation of FIG. 17 is exemplary and variations are contemplated to be within the scope of the present disclosure. For example, in various embodiments, the remote human operator management system can determine that the number of available remote human operators is greater than the number of requests from autonomous vehicles for remote human operators. In that situation, the remote human operator management system may present a list of requests to each remote human operator and permit the remote human operator to select a request from the list. The list can be presented on the visual display 330 of the remote human operator system 300 (FIG. 13.) In various embodiments, the requests presented to each remote human operator can be based on the experience information in the database. In various embodiments, the requests presented to each remote human operator can be based on new situations that a remote human operator would like to gain experience handling. The remote human operator can indicate preferences for such new experiences, and the preferences can be stored in the database.

It is contemplated that the embodiments disclosed in connection with FIGS. 13-17 can be combined in various ways. Accordingly, the illustrated and described embodiments are merely exemplary and do not limit the scope of the present disclosure.

Additional Features

In some embodiments, the robot fleet further includes at least one robot having a digital display for curated content comprising: advertisements (i.e., for both specific user and general public), including services provided, marketing/promotion, regional/location of areas served, customer details, local environment, lost, sought or detected people, public service announcements, date, time, or weather.

The embodiments disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an embodiment," "in embodiments," "in various embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

The systems described herein may also utilize one or more controllers to receive various information and transform the received information to generate an output. The controller may include any type of computing device, computational circuit, or any type of processor or processing circuit capable of executing a series of instructions that are stored in a memory. The controller may include multiple processors and/or multicore central processing units (CPUs) and may include any type of processor, such as a microprocessor, digital signal processor, microcontroller, programmable logic device (PLD), field programmable gate array (FPGA), or the like. The controller may also include a memory to store data and/or instructions that, when executed by the one or more processors, causes the one or more processors to perform one or more methods and/or algorithms.

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

It should be understood that the foregoing description is only illustrative of the present disclosure. Various alternatives and modifications can be devised by those skilled in the art without departing from the disclosure. Accordingly, the present disclosure is intended to embrace all such alternatives, modifications and variances. The embodiments described with reference to the attached drawing figures are presented only to demonstrate certain examples of the disclosure. Other elements, steps, methods, and techniques that are insubstantially different from those described above and/or in the appended claims are also intended to be within the scope of the disclosure.

What is claimed is:

1. An autonomous land vehicle comprising:
    a land vehicle conveyance system;
    a sensor system configured to capture sensor information including at least one of: surrounding environment information or vehicle subsystem information;
    a communication system configured to communicate with a remote human operator management system;
    at least one processor; and
    a memory storing instructions which, when executed by the at least one processor, cause the autonomous land vehicle to, autonomously:
        determine, based on the sensor information, to request a remote human operator;
        communicate a request to the remote human operator management system for a remote human operator to assume control of the land vehicle conveyance system;
        determine a risk rating based on the sensor information, how much time is available to safely react to a situation, and an estimated safety of autonomous risk mitigation procedures that can be executed by the autonomous land vehicle until a remote human operator assumes control, wherein in determining the risk rating based on the estimated safety of the autonomous risk mitigation procedures, the instructions, when executed by the at least one processor, cause the autonomous land vehicle to:
            access the autonomous risk mitigation procedures;
            estimate, based on the sensor information, a probability of success in executing the autonomous risk mitigation procedures to produce an estimated probability of success;
            determine the risk rating based on the estimated probability of success, wherein the risk rating is inversely related to the probability of success, and wherein the request communicated to the remote human operator includes the risk rating;
            determine a most effective autonomous risk mitigation procedure based on the estimated probability of success; and
            execute the most effective autonomous risk mitigation procedure, wherein in executing the most effective autonomous risk mitigation procedure the instructions, when executed by the at least one processor, cause the autonomous land vehicle to control the land vehicle conveyance system to mitigate risk until the remote human operator assumes control of the land vehicle conveyance system.

2. The autonomous land vehicle of claim 1, wherein the request includes at least a portion of the sensor information captured by the sensor system.

3. The autonomous land vehicle of claim 2, wherein the sensor information includes image information or video information that is included in the request.

4. The autonomous land vehicle of claim 1, wherein in determining to request a remote human operator, the instructions, when executed by the at least one processor, cause the autonomous land vehicle to determine, based on the vehicle subsystem information, that at least one subsystem is not functioning properly.

5. The autonomous land vehicle of claim 1, wherein in determining to request a remote human operator, the instructions, when executed by the at least one processor, cause the autonomous land vehicle to determine, based on the sensor information, that a next maneuver cannot be autonomously determined.

6. The autonomous land vehicle of claim 1, wherein the situation is a surrounding environment situation and wherein in determining to request a remote human operator, the instructions, when executed by the at least one processor, cause the autonomous land vehicle to determine, based on the surrounding environment information, that the surrounding environment situation is not recognized.

7. The autonomous land vehicle of claim 6, wherein in determining to request a remote human operator, the instructions, when executed by the at least one processor, cause the autonomous land vehicle to:
    access information representing predetermined situations or predetermined roadways that are to require a request for a remote human operator; and
    determine, based on the sensor information, that at least one of the predetermined situations or the predetermined roadways has been encountered.

8. The autonomous land vehicle of claim 1, wherein the situation is a surrounding environment situation, and wherein in determining to request a remote human operator, the instructions, when executed by the at least one processor, cause the autonomous land vehicle to determine, based on the surrounding environment information, that a surrounding environment situation should not be autonomously handled.

9. The autonomous land vehicle of claim 8, wherein the situation is a vehicle subsystem situation of at least one subsystem, and wherein in determining to request a remote human operator, the instructions, when executed by the at least one processor, cause the autonomous land vehicle to determine, based on the vehicle subsystem information, that the vehicle subsystem situation of the at least one subsystem is not recognized.

10. The autonomous land vehicle of claim 8, wherein in determining to request a remote human operator, the instructions, when executed by the at least one processor, cause the autonomous land vehicle to:
    access a predetermined operating geography; and
    determine, based on the surrounding environment information, that the autonomous land vehicle is outside the predetermined operating geography.

11. The autonomous land vehicle of claim 1, wherein in estimating the probability of success in executing the autonomous risk mitigation procedures, the instructions, when executed by the at least one processor, cause the autonomous land vehicle to estimate the probability of success based on at least one of: road speed limits, current vehicle speed, current speed of surrounding vehicles, number of surrounding vehicles, number of surrounding pedestrians, number of surrounding objects, road width, weather conditions, available time to react, or proximity to surrounding vehicles.

12. The autonomous land vehicle of claim 1, wherein in the autonomous land vehicle controlling the land vehicle conveyance system to mitigate risk, the instructions, when executed by the at least one processor, cause the autonomous land vehicle to perform at least one of: park at a curb, parking in a parking lot, travel on roadways in search of parking, or depart from a planned route to a roadway having lower risk.

13. The autonomous land vehicle of claim 1, wherein in controlling the land vehicle conveyance system to mitigate risk, the instructions, when executed by the at least one processor, cause the autonomous land vehicle to travel at a slower speed than a travel speed without the risk.

14. The autonomous land vehicle of claim 1, wherein the instructions, when executed by the at least one processor, cause the autonomous land vehicle to switch between an autonomous mode in which a remote human operator cannot affect movement of the autonomous land vehicle and a remote operation mode in which the remote human operator can assume control of the autonomous land vehicle.

15. The autonomous land vehicle of claim 14, wherein the autonomous land vehicle is caused to be switched from the autonomous mode to the remote operation mode by the remote human operator.

16. The autonomous land vehicle of claim 1, wherein the autonomous land vehicle does not include space for a human operator within the autonomous land vehicle.

17. The autonomous land vehicle of claim 1, wherein in determining to request a remote human operator, the instructions, when executed by the at least one processor, cause the autonomous land vehicle to determine, based on the sensor information, that multiple attempts to execute an autonomous maneuver have failed.

18. The autonomous land vehicle of claim 17, wherein in determining to request a remote human operator, the instructions, when executed by the at least one processor, cause the autonomous land vehicle to determine, based on the sensor information, that the multiple attempts to execute the autonomous maneuver have failed within a predetermined time period.

19. A method of operation of an autonomous land vehicle, comprising:
  capturing, with a sensor system on the autonomous land vehicle, sensor information including at least one of: surrounding environment information or vehicle subsystem information;
  determining, based on the sensor information, to request a remote human operator;
  communicating a request to a remote human operator management system for a remote human operator to assume control of a conveyance system of the autonomous land vehicle;
    determining a risk rating based on the sensor information, how much time is available to safely react to a situation, and an estimated safety of autonomous of autonomous risk mitigation procedures that can be executed by the autonomous land vehicle until a remote human operator assumes control, wherein determining the risk rating based on the estimated safety of the autonomous risk mitigation procedures comprises:
      accessing the autonomous risk mitigation procedures;
    estimating, based on the sensor information, a probability of success in executing the autonomous risk mitigation procedures to produce an estimated probability of success;
    determining a most effective autonomous risk mitigation procedure based on the estimated probability of success; and
    executing the most effective autonomous risk mitigation procedure, wherein executing the most effective autonomous risk mitigation procedure comprises controlling a land vehicle conveyance system to mitigate risk until the remote human operator assumes control of the conveyance system of the autonomous land vehicle.

20. The method of claim 19, wherein the request includes at least a portion of the sensor information captured by the sensor system.

21. The method of claim 19, wherein the situation is a surrounding environment situation and wherein determining to request the remote human operator includes determining, based on the surrounding environment information, that the surrounding environment situation is not recognized.

22. The method of claim 21, wherein determining to request the remote human operator includes:
  accessing information representing predetermined situations or predetermined roadways that are to require a request for a remote human operator; and
  determining, based on the sensor information, that at least one of the predetermined situations or the predetermined roadways has been encountered.

23. The method of claim 19, wherein the situation is a surrounding environment situation and wherein determining to request the remote human operator includes determining, based on the surrounding environment information, that a surrounding environment situation should not be autonomously handled.

24. The method of claim 23, wherein determining to request the remote human operator further includes:
  accessing information representing a predetermined operating geography; and
  determining, based on the surrounding environment information, that the autonomous land vehicle is outside the predetermined operating geography.

25. The method of claim 19, wherein determining to request a remote human operator includes the autonomous land vehicle determining, based on the sensor information, that multiple attempts to execute an autonomous maneuver have failed.

26. The method of claim 25, wherein determining to request a remote human operator includes the autonomous land vehicle determining, based on the sensor information, that the multiple attempts to execute the autonomous maneuver have failed within a predetermined time period.

27. A non-transitory storage media encoded with instructions that, when executed by at least one processor, cause the at least one processor to perform operations including:
  capturing, with a sensor system on an autonomous land vehicle, sensor information including at least one of: surrounding environment information or vehicle subsystem information;
  determining, based on the sensor information, to request a remote human operator;

communicating a request to a remote human operator management system for a remote human operator to assume control of a conveyance system of the autonomous land vehicle;

determining a risk rating based on the sensor information, how much time is available to safely react to a situation, and an estimated safety of autonomous of autonomous risk mitigation procedures that can be executed by the autonomous land vehicle until a remote human operator assumes control, wherein determining the risk rating based on the estimated safety of the autonomous risk mitigation procedures comprises:

accessing the autonomous risk mitigation procedures;

estimating, based on the sensor information, a probability of success in executing the autonomous risk mitigation procedures to produce an estimated probability of success;

determining the risk rating based on the estimated probability of success, wherein the risk rating is inversely related to the probability of success, and wherein the request communicated to the remote human operator includes the risk rating;

determining a most effective autonomous risk mitigation procedure based on the estimated probability of success; and executing the most effective autonomous risk mitigation procedure, wherein executing the most effective autonomous risk mitigation procedure comprises controlling a land vehicle conveyance system to mitigate risk until the remote human operator assumes control of the conveyance system of the autonomous land vehicle.

28. The non-transitory storage media of claim 27, wherein the request includes at least a portion of the sensor information captured by the sensor system.

29. The non-transitory storage media of claim 27, wherein the situation is a surrounding environment situation and wherein the instructions that cause the at least one processor to perform the determining to request the remote human operator include instructions for determining, based on the surrounding environment information, that the surrounding environment situation is not recognized.

* * * * *